United States Patent
Rao

(10) Patent No.: US 12,015,516 B2
(45) Date of Patent: *Jun. 18, 2024

(54) DYNAMIC SERVICE CHAINING AND LATE BINDING

(71) Applicant: Gigamon Inc., Santa Clara, CA (US)

(72) Inventor: Anil Rao, Santa Clara, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,201

(22) Filed: Feb. 27, 2023

(65) Prior Publication Data

US 2023/0291634 A1 Sep. 14, 2023

Related U.S. Application Data

(63) Continuation of application No. 17/142,145, filed on Jan. 5, 2021, now Pat. No. 11,595,240, which is a (Continued)

(51) Int. Cl.
*H04L 41/046* (2022.01)
*H04L 12/46* (2006.01)
(Continued)

(52) U.S. Cl.
CPC ........ *H04L 41/046* (2013.01); *H04L 12/4633* (2013.01); *H04L 41/12* (2013.01);
(Continued)

(58) Field of Classification Search
CPC ... H04L 41/046; H04L 12/4633; H04L 41/12; H04L 41/22; H04L 43/022; H04L 43/028;
(Continued)

(56) References Cited

U.S. PATENT DOCUMENTS 6,167,445 A 12/2000 Gai et al.
6,633,560 B1 10/2003 Albert et al.
(Continued)

OTHER PUBLICATIONS

Notice of Allowance and Examiner Interview Summary for U.S. Appl. No. 17/175,551 mailed Mar. 29, 2023, 20 pages.
(Continued)

*Primary Examiner* — Mohammed S Chowdhury
(74) *Attorney, Agent, or Firm* — Perkins Coie LLP

(57) ABSTRACT

A visibility platform can be used to monitor traffic traversing private cloud infrastructures and/or public cloud infrastructures. In some instances, the traffic is provided to a set of network services that are accessible to the visibility platform. These network services can be provisioned in a serial or parallel fashion. Network service chaining can be used to ensure that traffic streams skip unnecessary network services and receive only those network services that are needed. For example, an email service chain can include virus, spam, and phishing detection, while a video streaming service chain can include traffic shaping policies to satisfy quality of service (QoS) guarantees. When the visibility platform is represented as a graph that makes use of action sets, network service chains can be readily created or destroyed on demand.

23 Claims, 19 Drawing Sheets

Related U.S. Application Data continuation of application No. 15/805,487, filed on Nov. 7, 2017, now Pat. No. 10,917,285.

(60) Provisional application No. 62/425,577, filed on Nov. 22, 2016.

(51) Int. Cl.
| | |
|---|---|
| *H04L 41/12* | (2022.01) |
| *H04L 41/22* | (2022.01) |
| *H04L 43/022* | (2022.01) |
| *H04L 43/028* | (2022.01) |
| *H04L 43/062* | (2022.01) |
| *H04L 43/12* | (2022.01) |
| *H04L 45/02* | (2022.01) |
| *H04L 47/24* | (2022.01) |
| *H04L 49/00* | (2022.01) |
| *H04L 67/10* | (2022.01) |

(52) U.S. Cl.
CPC ............ *H04L 41/22* (2013.01); *H04L 43/022* (2013.01); *H04L 43/028* (2013.01); *H04L 43/062* (2013.01); *H04L 43/12* (2013.01); *H04L 45/02* (2013.01); *H04L 47/24* (2013.01); *H04L 49/70* (2013.01); *H04L 67/10* (2013.01)

(58) Field of Classification Search
CPC ....... H04L 43/062; H04L 43/12; H04L 45/02; H04L 47/24; H04L 49/70; H04L 67/10; H04L 41/40; H04L 43/20
See application file for complete search history.

(56) References Cited

U.S. PATENT DOCUMENTS

| | | |
|---|---|---|
| 7,680,100 B1 | 3/2010 | Corliss et al. |
| 9,037,571 B1 | 5/2015 | Baranowski et al. |
| 9,672,189 B2 | 6/2017 | Raz et al. |
| 9,906,401 B1 | 2/2018 | Rao |
| 10,177,963 B2 | 1/2019 | Rao |
| 10,264,020 B1 | 4/2019 | Nanda et al. |
| 10,382,529 B2 | 8/2019 | Wan et al. |
| 2003/0130821 A1 | 7/2003 | Anslow et al. |
| 2004/0148376 A1 | 7/2004 | Rangan et al. |
| 2006/0053279 A1 | 3/2006 | Coueignoux |
| 2006/0126645 A1 | 6/2006 | Devarapalli et al. |
| 2007/0266370 A1 | 11/2007 | Myers et al. |
| 2008/0025322 A1 | 1/2008 | Tadimeti et al. |
| 2008/0137591 A1 | 6/2008 | Hirano et al. |
| 2008/0301394 A1 | 12/2008 | Muppirala et al. |
| 2011/0228696 A1 | 9/2011 | Agarwal et al. |
| 2011/0310899 A1* | 12/2011 | Alkhatib ................. H04L 45/74 370/392 |
| 2011/0318011 A1 | 12/2011 | Brassil |
| 2012/0047096 A1 | 2/2012 | Duffield et al. |
| 2012/0233668 A1 | 9/2012 | Leafe et al. |
| 2013/0125124 A1 | 5/2013 | Kempf et al. |
| 2014/0156707 A1 | 6/2014 | Sax et al. |
| 2014/0188701 A1 | 7/2014 | Sreedhararaj et al. |
| 2014/0244851 A1 | 8/2014 | Lee |
| 2015/0009828 A1 | 1/2015 | Murakami |
| 2015/0040228 A1 | 2/2015 | Lee et al. |
| 2015/0074258 A1 | 3/2015 | Ferreira et al. |
| 2015/0128245 A1 | 5/2015 | Brown et al. |
| 2015/0229656 A1 | 8/2015 | Shieh |
| 2015/0244716 A1 | 8/2015 | Potlapally et al. |
| 2015/0295758 A1 | 10/2015 | Melander et al. |
| 2015/0295779 A1 | 10/2015 | Ching et al. |
| 2015/0319063 A1 | 11/2015 | Zourzouvillys |
| 2015/0370596 A1 | 12/2015 | Fahs et al. |
| 2016/0105471 A1 | 4/2016 | Nunes et al. |
| 2016/0182336 A1 | 6/2016 | Doctor et al. |
| 2016/0226944 A1 | 8/2016 | Hsiao et al. |
| 2016/0357587 A1 | 12/2016 | Yadav et al. |
| 2016/0359697 A1 | 12/2016 | Scheib et al. |
| 2016/0359872 A1 | 12/2016 | Yadav et al. |
| 2017/0026283 A1 | 1/2017 | Williams et al. |
| 2017/0034010 A1 | 2/2017 | Fong et al. |
| 2017/0063886 A1* | 3/2017 | Muddu ................. H04L 63/06 |
| 2017/0078426 A1 | 3/2017 | Dickens et al. |
| 2017/0085447 A1 | 3/2017 | Chen et al. |
| 2017/0099195 A1 | 4/2017 | Raney |
| 2017/0171158 A1 | 6/2017 | Hoy et al. |
| 2017/0180421 A1 | 6/2017 | Shieh et al. |
| 2017/0208011 A1 | 7/2017 | Bosch et al. |
| 2017/0279687 A1 | 9/2017 | Muntés-mulero et al. |
| 2017/0279690 A1 | 9/2017 | Tripathi et al. |
| 2017/0317976 A1 | 11/2017 | Chalvadi et al. |
| 2017/0366395 A1 | 12/2017 | Goldfarb et al. |
| 2018/0027006 A1 | 1/2018 | Zimmermann et al. |
| 2018/0063193 A1 | 3/2018 | Chandrashekhar et al. |
| 2018/0089278 A1* | 3/2018 | Bhattacharjee ..... H04L 67/1097 |
| 2018/0091392 A1 | 3/2018 | Richards et al. |
| 2018/0102953 A1 | 4/2018 | Mahindru et al. |
| 2018/0102985 A1 | 4/2018 | Byers et al. |
| 2018/0121250 A1 | 5/2018 | Qi et al. |
| 2019/0146998 A1* | 5/2019 | Jin ........................ G06F 9/4881 718/104 |
| 2019/0245950 A1* | 8/2019 | Shcherbakov .......... H04L 69/22 |
| 2020/0314179 A1 | 10/2020 | He et al. |

OTHER PUBLICATIONS

Final Office Action for U.S. Appl. No. 17/213,735 mailed Feb. 23, 2023, 24 pages, Feb. 23, 2023.
Final Office Action for U.S. Appl. No. 17/175,551 mailed Jan. 12, 2023; 48 pages., Jan. 12, 2023.
Final Office Action mailed Aug. 18, 2017, for U.S. Appl. No. 15/433,864 of Rao filed Feb. 15, 2017.
Non-Final Office Action, mailed May 11, 2017, for U.S. Appl. No. 15/433,864, of A. Rao, filed Feb. 15, 2017.
U.S. Appl. No. 15/815,524 of Rao, A. filed Nov. 16, 2017.
U.S. Appl. No. 15/805,505 of Rao, A. filed Nov. 7, 2017.
U.S. Appl. No. 15/805,487 of Rao, A. filed Nov. 7, 2017.
U.S. Appl. No. 15/805,460 of Rao, A. filed Nov. 7, 2017.
U.S. Appl. No. 15/885,534 of Rao, A. filed Jan. 31, 2018.
Notice of Allowance mailed Dec. 21, 2017, for U.S. Appl. No. 15/433,864 of Rao, A. filed Feb. 15, 2017.
Non-Final Office Action Mailed May 8, 2018 of U.S. Appl. No. 15/885,534 by Rao, A., filed Jan. 31, 2018.
Notice of Allowance Mailed Sep. 7, 2018 of U.S. Appl. No. 15/885,534 by Rao, A., filed Jan. 31, 2018.
Non-Final Office Action, mailed Dec. 21, 2018, for U.S. Appl. No. 15/815,524, of A. Rao, filed Nov. 16, 2017; 46 pages.
Non-Final Office Action mailed Jan. 11, 2019 for U.S. Appl. No. 15/805,487 of Rao, Anil, filed Nov. 7, 2017, 46 page.
Final Office Action mailed May 31, 2019 for U.S. Appl. No. 15/815,524, filed Nov. 16, 2017; 43 pages.
Final Office Action mailed Jul. 5, 2019 for U.S. Appl. No. 15/805,487 of Anil Rao, filed Nov. 7, 2017, 41 pages.
Non-Final Office Action mailed Jul. 17, 2019 for U.S. Appl. No. 15/805,460 of Anil Rao, filed Nov. 7, 2017, 25 pages.
U.S. Appl. No. 16/212,486 of Rao, A. filed Dec. 6, 2018.
Final Office Action mailed Nov. 7, 2019 for U.S. Appl. No. 15/805,460 of Anil Rao, filed Nov. 7, 2017, 17 pages.
Non Final Office Action mailed Dec. 11, 2019, U.S. Appl. No. 15/815,524, filed Nov. 16, 2017; 47 pages.
Non Final Office Action mailed Jan. 23, 2020, for U.S. Appl. No. 15/805,487, filed Nov. 7, 2017; 38 pages.
Non Final Office Action mailed Mar. 9, 2020, for U.S. Appl. No. 15/805,460, filed Nov. 7, 2017; 24 pages.
Advisory Action for U.S. Appl. No. 15/805,460 mailed Feb. 7, 2020; 4 pages.
Non-Final Office Action mailed Mar. 27, 2020, for U.S. Appl. No. 15/805,505, filed Nov. 7, 2017, 34 pages.
Non Final Office Action mailed Mar. 27, 2020, for U.S. Appl. No. 15/805,487, filed Nov. 7, 2017; 34 pages.

(56) References Cited

OTHER PUBLICATIONS

Non Final Office Action mailed Apr. 10, 2020 for U.S. Appl. No. 16/212,486; 33 pages.
Final Office Action mailed May 8, 2020 for U.S. Appl. No. 15/815,524, filed Nov. 16, 2017; 50 pages.
Final Office Action mailed May 12, 2020 for U.S. Appl. No. 15/805,487; 47 pages.
Final Office Action mailed May 15, 2020 for U.S. Appl. No. 15/805,460, filed Nov. 7, 2017; 29 pages.
Notice of Allowance mailed Jun. 18, 2020 for U.S. Appl. No. 16/212,486 of Anil Rao; 15 pages.
Notice of Allowance mailed Jul. 1, 2020 for U.S. Appl. No. 15/805,505, filed Nov. 7, 2017, 21 pages.
Notice of Allowance mailed Oct. 23, 2020 for U.S. Appl. No. 16/598,416, filed Oct. 10, 2019, 28 pages.
Notice of Allowance mailed Nov. 5, 2020 for U.S. Appl. No. 15/805,487, filed Nov. 6, 2017, 22 pages.
Notice of Allowance mailed Nov. 25, 2020 for U.S. Appl. No. 15/815,524, filed Nov. 15, 2017, 27 pages.
Notice of Allowance mailed Jan. 1, 2021 for U.S. Appl. No. 15/805,460; 22 pages.
Non-Final Office Action mailed Sep. 3, 2021 for U.S. Appl. No. 17/017,378, 20 pages.
Notice of Allowance mailed Dec. 10, 2021 for U.S. Appl. No. 17/017,378, filed Sep. 10, 2020, 7 pages.
Non-Final Office Action for U.S. Appl. No. 17/142,145; 56 pages.
Non-Final Office Action for U.S. Appl. No. 17/175,551 mailed Aug. 11, 2022; 60 pages.
Non-Final Office Action mailed Sep. 28, 2022 for U.S. Appl. No. 17/213,735, 36 pages.
Notice of Allowance mailed Nov. 23, 2022 for U.S. Appl. No. 17/142,145, 21 pages.

* cited by examiner

1800

Construct a separate graph that visually represents traffic flow for each visibility platform
1801

Generate a visual representation of the distributed visibility fabric
1802

Cause the visual representation of the distributed visibility fabric to be displayed by a computing device
1803

Map network objects onto multiple network visibility appliances
1804

Monitor a connectivity status of each network visibility appliance
1805

Determine that a first network visibility appliance has become unresponsive
1806

Modify a traffic flow directed toward the first network visibility appliance by redirecting the traffic flow to a second network visibility appliance
1807

FIG. 18

DYNAMIC SERVICE CHAINING AND LATE BINDING

CROSS-REFERENCE TO RELATED APPLICATIONS

This application is a continuation of U.S. patent application Ser. No. 17/142,145, filed on Jan. 5, 2021, issued as U.S. Pat. No. 11,595,240, on Feb. 28, 2023, which is a continuation of U.S. patent application Ser. No. 15/805,487, titled "Dynamic Service Chaining and Late Binding" and filed on Nov. 7, 2017, now U.S. Pat. No. 10,917,285, issued on Feb. 9, 2021, which claims priority to U.S. Provisional Patent Application No. 62/425,577, titled "Programmable Network Switches for Cloud Computing Architectures" and filed on Nov. 22, 2016, each of which is incorporated by reference herein in its entirety.

FIELD OF THE INVENTION

At least one embodiment of the present disclosure pertains to techniques for modeling network traffic and, more particularly, to techniques for designing the network fabric of a network visibility appliance using graphs.

BACKGROUND

Cloud computing is a type of computing that provides shared processing resources and data to computing devices on demand. More specifically, cloud computing models enable on-demand access to a shared pool of configurable processing resources (e.g., computer networks, servers, storage mediums, applications, and/or services) that can be rapidly provisioned and released with minimal management effort.

Several different models exist for deploying cloud computing infrastructures. "Private clouds," for example, are infrastructures that operate solely for a single end user (e.g., an enterprise or individual). Private clouds can be managed internally (e.g., by the end user) or by a third party, and they can be hosted internally or externally. Thus, while private clouds are dedicated to a particular end user, multiple private clouds belonging to different end users may be supported by a single third party. "Public clouds," meanwhile, are infrastructures that are open for public use (i.e., are accessible to multiple end users). Although there may be little or no technical difference between private and public cloud infrastructures, security considerations may vary substantially based on the number of end users to whom a cloud computing platform is made available.

Infrastructure-as-a-Service is a form of cloud computing that provides virtualized computing resources. These virtualized computing resources may be provided over a network, such as the Internet. The rapid evolution of IaaS has brought advantages such as economies of scale, elasticity, and agility to enterprises seeking to modernize their information technology (IT) and data center infrastructures. Consequently, many enterprise administrators have begun re-evaluating past decisions to deploy or scale applications on premises, and instead have begun considering deploying or scaling applications across a cloud computing platform.

BRIEF DESCRIPTION OF THE DRAWINGS

One or more embodiments of the present invention are illustrated by way of example and not limitation in the figures of the accompanying drawings, in which like references indicate similar elements.

FIG. 18 depicts a process for managing a distributed visibility fabric that includes multiple visibility platforms.

DETAILED DESCRIPTION

Figure 1:
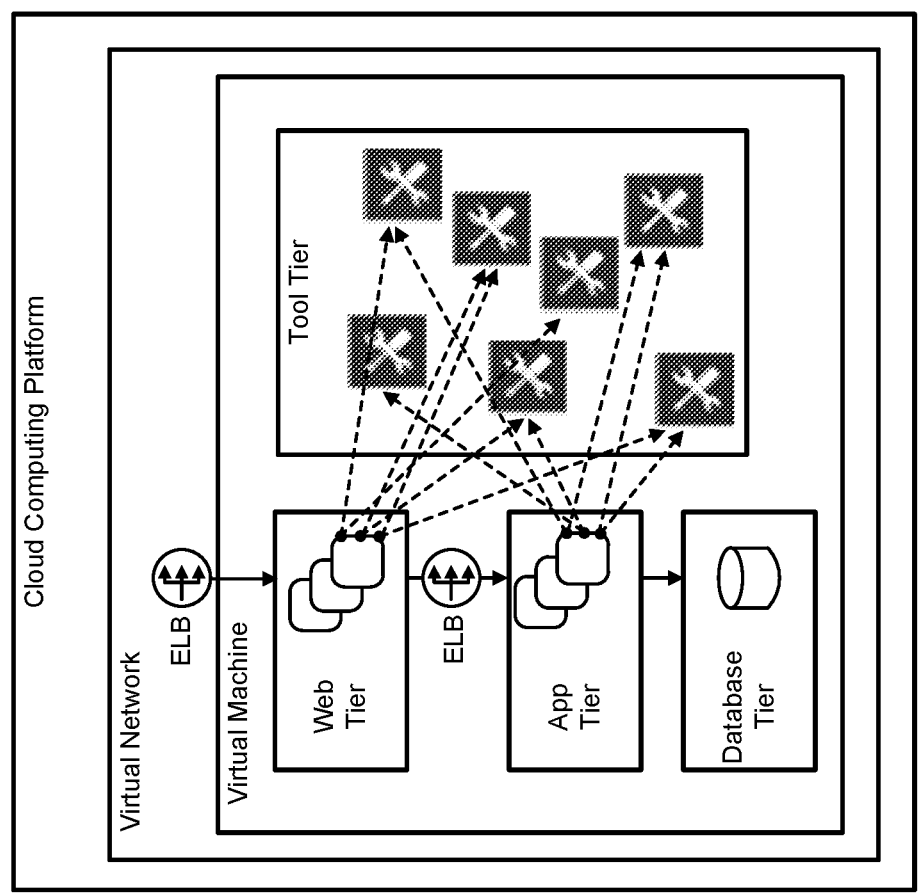
FIG. 1 depicts a conventional cloud computing platform having a three-tier architecture that includes a Web Tier, an Application (App) Tier, and a Database Tier.

With exponential growth in workloads within physical data centers, many end users (e.g., individuals and enterprises) have begun moving work processes and data to cloud computing platforms. However, accessing virtualized traffic traversing the cloud computing platforms for application, network, and security analysis is a challenge.

Introduced here, therefore, are visibility platforms, and associated methods, for monitoring virtualized traffic traversing a cloud computing platform, such as Amazon Web Services, VMware, or OpenStack. A visibility platform can be integrated into a cloud computing platform to provide a coherent view of virtualized traffic in motion across the cloud computing platform for a given end user. Said another way, a visibility platform can intelligently select, manipulate, and forward virtualized traffic belonging to an end user to a monitoring infrastructure, thereby eliminating traffic blind sports.

A visibility platform can include one or more agents for mirroring virtualized traffic traversing a cloud computing platform, a network visibility appliance for aggregating and filtering the virtualized traffic, one or more controllers, and a client for managing the visibility platform as a whole.

Each agent can be fully contained within a target virtual machine whose virtualized traffic is to be monitored. Such an implementation allows virtual machine traffic flows of interest to be selected, forwarded, and delivered to a monitoring infrastructure (e.g., a programmable switch that is connected to one or more network tools). Although the agent(s) serve requests issued by the controller(s), each agent is responsible for dispatching its own virtualized traffic back to the monitoring infrastructure.

The programmable switch, which may be a physical switch or virtual switch, is responsible for aggregating virtualized traffic mirrored by the agent(s), and then forwarding at least some of the aggregated virtualized traffic to one or more network tools for further analysis. In some embodiments, the programmable switch filters and/or manipulates (e.g., by slicing, masking, sampling, and/or replicating) the aggregated virtualized traffic before forwarding it downstream to the network tool(s).

The controller(s), meanwhile, may be controllable by the end user via the client, which may be hosted on the cloud computing platform or in an on-premises computing environment controlled by the end user. Together, the client and the controller(s) enable centralized management of the visibility platform as a whole. For example, the client may be configured to integrate with one or more application programming interfaces (APIs) offered by the cloud computing platform in order to retrieve relevant information about the virtualized traffic being monitored.

Such a design not only provides greater visibility into virtualized traffic traversing a cloud computing platform, but can also extend the reach and leverage of existing network tools already owned or managed by the end user to begin monitoring virtual network infrastructure.

Terminology

Reference to "one embodiment" or "an embodiment" means that the particular feature, function, structure, or characteristic being described is included in at least one embodiment of the present disclosure. Occurrences of such phrases do not necessarily all refer to the same embodiment, nor are they necessarily referring to alternative embodiments that are mutually exclusive of one another.

The terms "connected," "coupled," or any variant thereof includes any connection or coupling between two or more elements, either direct or indirect. The coupling/connection can be physical, logical, or a combination thereof. For example, two devices may be physically, electrically, and/or communicatively coupled to one another.

General System Overview

FIG. 1 depicts a conventional cloud computing platform having a three-tier architecture that includes a Web Tier, an Application (App) Tier, and a Database Tier. Many enterprise administrators have begun deploying or scaling applications across cloud computing platforms (also referred to as "cloud management frameworks"), such as Amazon Web Services, VMware, and OpenStack. For example, many enterprise administrators have begun deploying applications on cloud computing platforms and/or using cloud computing platforms for high-bandwidth or "bursty" needs to augment on-premises storage environments (e.g., private clouds and physical data centers). In both cases, a hybrid cloud is ultimately created for the enterprise. Other enterprises may start with cloud computing resources and no physical data center footprint. Such a model is commonly referred to as a "born-in-the-cloud" model.

Unlike Software-as-a-Service (SaaS) environments in which application ownership and information security is the responsibility of the SaaS provider, an Information-as-a-Service (IaaS) environment (e.g., a public cloud) assigns these responsibilities to the end user. Accordingly, migrating existing workloads onto a cloud computing platform introduces new responsibilities and challenges for the individuals responsible for managing the move. For example, migration may require that an end user manage, secure, and understand data that is now traversing a public cloud infrastructure (which is not controlled by the end user). Traditional security tools that were developed for physical data centers and private clouds are simply not able to acquire this data of interest. Consequently, end users that migrate or deploy workloads to a public cloud face several challenges, including:

An inability to access traffic that is traversing the cloud computing platform for analysis (and, by extension, information about the virtualized traffic);

An inability to access data and perform tasks (e.g., deep packet inspection) in support of forensics, end user experience management, threat detection, and network tools;

A lack of visibility into vertical traffic flows (also referred to as North-South traffic) that may be necessary for compliancy and vertical threat detection/mitigation, such as Elastic Load Balancer (ELB) to Web Tier traffic;

A lack of visibility into horizontal traffic flows (also referred to as East-West traffic) that may be necessary for compliancy and lateral threat detection/mitigation, such as Web Tier to App Tier traffic or App Tier to Database Tier traffic;

A lack of sufficient, appropriate network tools (e.g., within a Tool Tier);

An inability to troubleshoot and debug virtual networks; and

Increased and varied costs should an end user choose to backhaul virtualized traffic from the cloud computing platform to an end user-controlled environment where one or more network tools are located.

When an end user uses an on-premises, single-tenant cloud computing platform (i.e., a private cloud), several options exist for accessing virtualized traffic traversing the private cloud infrastructure for real-time analysis. For example, virtualized traffic can be diverted using physical or virtual agents (e.g., tapping agents), switched port analyzer (SPAN) sessions, or other network visibility solutions. Agents are generally favored for gaining reliable, non-intrusive access to critical virtualized traffic traversing a network.

However, these options are typically not available when applications or workloads are deployed on a multi-tenant cloud computing platform (i.e., a public cloud). Reliably monitoring virtualized traffic traversing such infrastructures instead involves placing one or more tap devices at appropriate locations within the public cloud infrastructure. In some embodiments, traffic analyzers are attached to some or all of the tap device(s). The traffic analyzers can then see the same data packets passing through those network segments (i.e., as if the traffic analyzers were also inline with the traffic). A logical tap device can be constructed and implemented in several different ways.

First, the port mirroring functionality of a network switching element (e.g., a virtual or physical programmable switch) may be used to send a copy of data packets traversing one port to another port on the same network switching element. Although this functionality is supported by many modern physical and virtual programmable switches, it cannot be used to monitor the activity in many virtual networks due to two architectural characteristics of cloud computing platforms, multi-tenancy and location independence.

Multi-tenancy allows available resources and services to be shared among different end users (e.g., tenants of virtual machines). Each end user is provided with an environment that is completely isolated from other end users to the extent that a single end user may be unaware that other end users are co-existing. Multi-tenancy promotes delegation of control in a safe and secure manner. For example, end users may be permitted to create and administer their own private virtual networks.

Location independence, meanwhile, is primarily concerned with hiding the identifies of individual infrastructure components from the virtualized workloads, which makes it possible to relocate running virtual machines from one physical host to another. Another important benefit of location independence is improved efficiency in resource allocation that causes end users to be unaware of the physical host(s) on which their virtual machine(s) are running. In fact, virtual machines belonging to different end users (also referred to as "tenants") may be placed on the same physical host. In a shared ecosystem, end users are not given direct access to the underlying switching fabric that may include host-level virtual switches, top-of-rack switches, etc. This restriction avoids the possibility of any cross-tenant data leakage between the virtual machines. Unfortunately, this also means that the port-mirroring capability of the virtual switches supporting those virtual machines can no longer be used.

Figure 2:
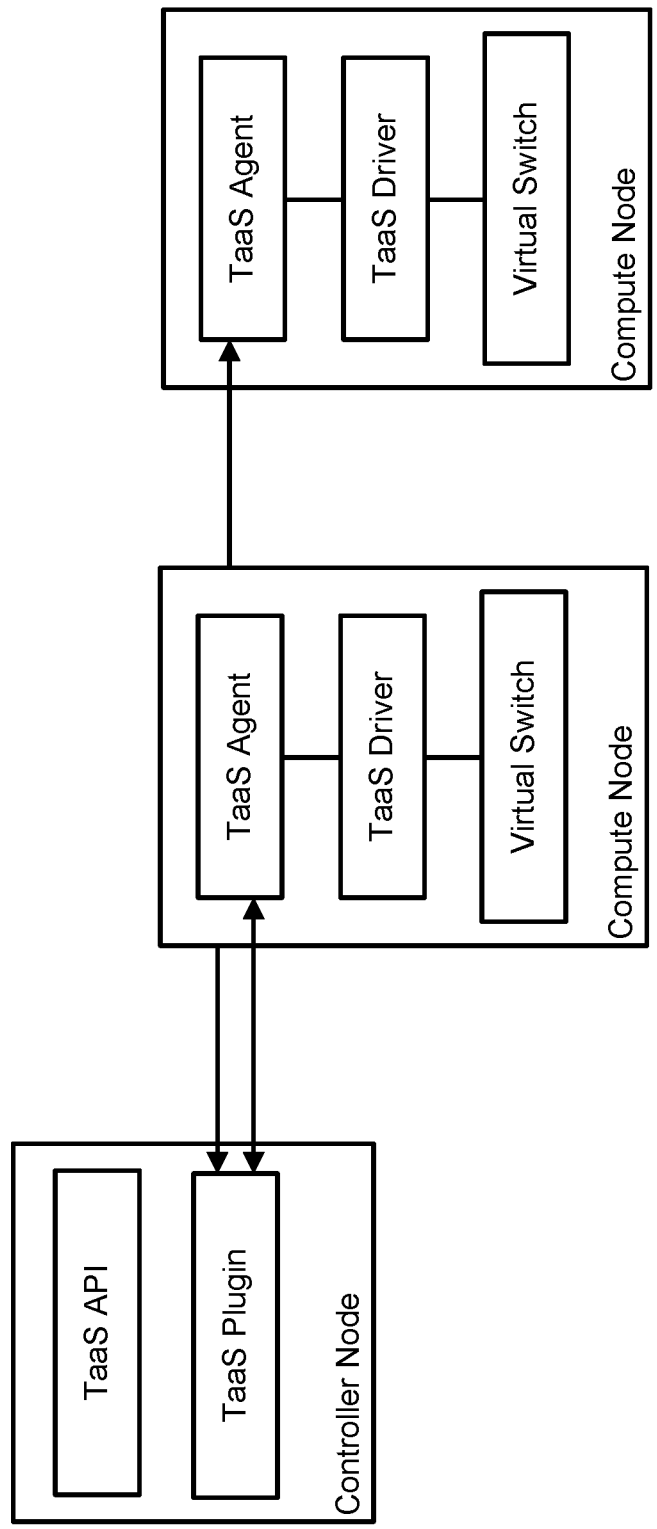
FIG. 2 depicts how Tap-as-a-Service (TaaS) may be used to implement a logical tap device in some embodiments.

Second, Tap-as-a-Service (TaaS) may be used to implement a logical tap device as shown in FIG. 2. TaaS may offer an application programming interface (API) that enables an end user or a cloud administrator to monitor individual ports of virtual programmable switches within a shared virtual network. Because it is vital that end user boundaries are not compromised, a given end user can only monitor its own ports (i.e., any port on one of its private virtual networks or a port created by the given end user on a shared virtual network). Moreover, TaaS can enable more complex traffic visibility solutions to be engineered for a diverse set of use cases, including network administration, application troubleshooting, network security troubleshooting, data analytics, etc. However, the complex nature of successfully implementing TaaS generally limits it to operating as an extension of an open source cloud computing platform (or some other cloud computing platform that permits significant back-end infrastructure modification). TaaS may be thought of as a platform-oriented tapping service (i.e., rather than an agent-based tapping service). Such functionality must be supported and facilitated by the (proprietary) cloud computing platform (e.g., OpenStack).

Third, a tap device (also referred to as a "tapping agent" or an "agent") may reside entirely within the virtual machine it is responsible for monitoring. As further described below, such a deployment allows the agent to select, forward, and deliver virtual machine traffic flows of interest to a visibility platform that monitors virtual workloads. The agent may be configured to "tap" a virtual machine traffic flow and direct duplicate copies of data packets to the visibility platform, or dispatch the virtual machine traffic flow itself to the visibility platform.

Attempts have been made to employ traditional agent-based monitoring technologies for the type of in-depth traffic monitoring and management activities described above. However, traditional agent-based monitoring technologies often lead to very complex architectures when used in combination with public cloud infrastructures, especially if multiple network tools require access to the same virtualized traffic for inspection and analysis as shown in FIG. 1. For example, traditional agent-based monitoring technologies experience challenges such as:

An overabundance of discrete agents that increase the complexity of the virtual network as a whole;

Decreased workload performance of the public cloud infrastructure;

Degradation of virtual network (e.g., Virtual Private Cloud) throughput and performance due to duplicate traffic; and Reactive, static visibility of the virtual network that is subject to heavy disruption.

Figure 3:
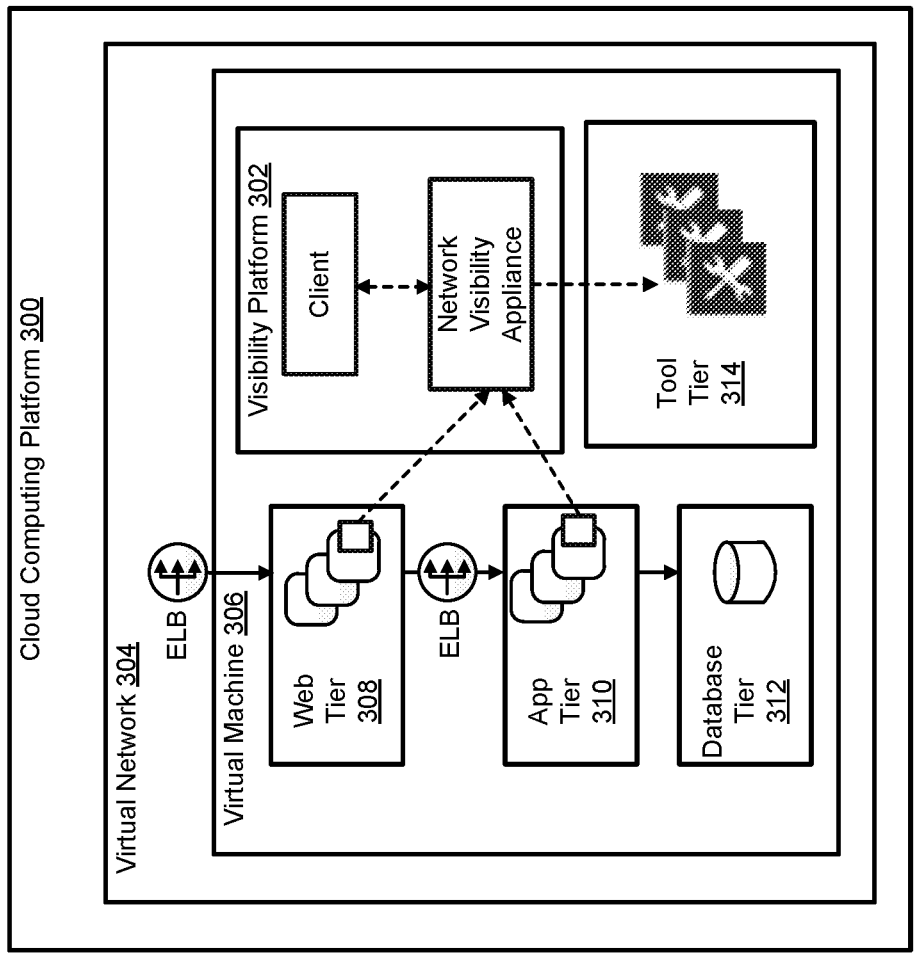
FIG. 3 depicts a visibility platform that addresses these challenges and can be used to provide consistent visibility into virtualized traffic traversing a public cloud architecture.

FIG. 3 depicts a visibility platform 302 that addresses these challenges and can be used to provide consistent visibility into virtualized traffic traversing a public cloud architecture. Thus, the visibility platform 302 may provide a coherent view of traffic in motion across the public cloud architecture for a given end user. The visibility platform 302 may be used to provide a holistic view of data maintained across on-premises locations, remote sites, public clouds, private clouds, hybrid clouds, or some combination thereof. Such visibility enables the visibility platform 302 to analyze traffic (e.g., perform risk analytics, security analytics, etc.) in a manner that wouldn't otherwise be possible.

The visibility platform 302 may be implemented as a comprehensive visibility tier on a virtual network 304 that is dedicated to the given end user's account with a cloud computing platform 300. Such a configuration ensures that consistent ways of accessing, categorizing, and consolidating the delivery of virtualized traffic to security tools and performance management tools continue to exist. Such a configuration also allows the visibility platform 302 and each of these tools to be operable as in-band (i.e., "inline") devices or out-of-band devices. Out-of-band devices operate outside of the path of data traffic between an origination node and a destination node and receive copies of the data packets that make up the traffic, rather than the original data packets. Out-of-band devices are able to freely modify the copies of the data packets because the original data packets are allowed to traverse the virtual network 304 unimpeded. Inline devices, on the other hand, operate within the path of data traffic between an origination node and a destination node and receive and forward the original data packets.

As further described below, the visibility platform 302 enables several notable advantages, including:

A consistent way to access virtualized traffic traversing one or more virtual machines 306 (e.g., within a Web Tier 308, App Tier 310, and/or Database Tier 312);

Effective distribution of virtualized traffic to one or more network tools (e.g., within a Tool Tier 314);

An ability to customize which virtualized traffic is routed to which network tool(s) using traffic policies; and Delivery of an elastic, on-demand visibility as end user workloads scale out.

Note that although references may be made here to a particular cloud computing platform (e.g., Amazon Web Services), the technology described herein is equally applicable to any cloud computing platform. Some embodiments of the technology are also applicable to other (i.e., non-cloud) computing environments.

Visibility Platform Architecture

Figure 4:
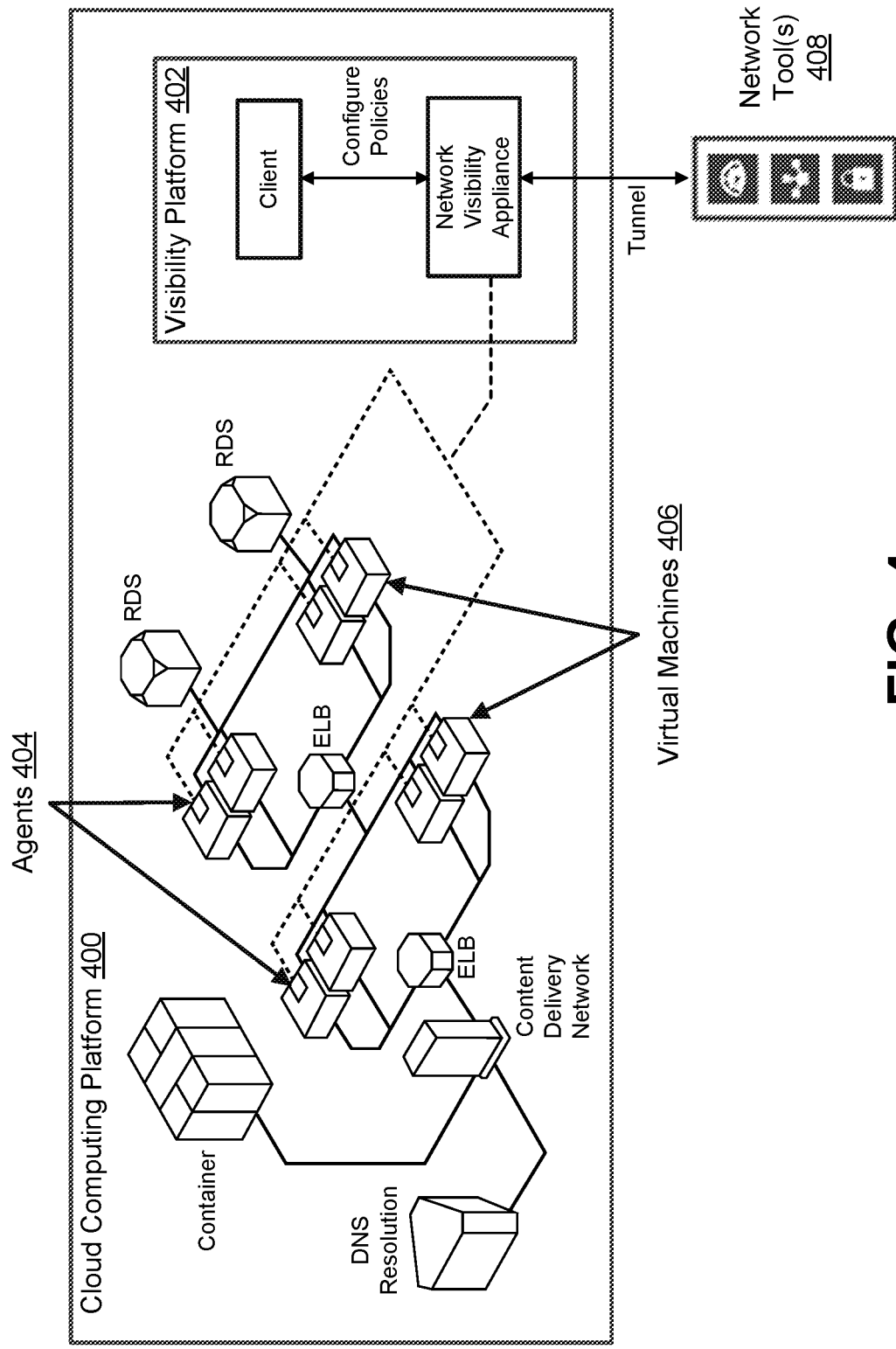
FIG. 4 depicts an example of how a visibility platform can be integrated into a cloud computing platform to provide a coherent view of virtualized traffic in motion across the public cloud infrastructure for a given end user.

FIG. 4 depicts an example of how a visibility platform 402 can be integrated into a cloud computing platform 400 to provide a coherent view of virtualized traffic in motion across the public cloud infrastructure for a given end user. By installing agents 404 on some or all of the virtual machines 406 belonging to the given end user, the visibility platform 402 can acquire data packets (or duplicate copies of the data packets) traversing the public cloud infrastructure for further analysis in order to improve visibility into possible security risks.

The network environment shown in FIG. 4 often involves three separate entities: (1) a provider who maintains the public cloud infrastructure needed to support or host the cloud computing platform 400; (2) a security entity who monitors virtualized traffic traversing the cloud computing platform 400 to identify security risks; and (3) an end user (e.g., an individual or an enterprise) who employs the cloud computing platform 400 to run an application, store data, etc. Here, for example, the provider is responsible for managing a public cloud infrastructure, while the security entity is responsible for managing the visibility platform 402.

In some embodiments, the visibility platform 402 is communicatively coupled to one or more network tools 408 for analyzing the virtualized traffic. The network tool(s) 408 can be hosted locally as part of the visibility platform 402 (i.e., on the cloud computing platform 400) or remotely (e.g., within an on-premises computing environment controlled by the end user). When the visibility platform 402 is entirely virtual, the visibility platform 402 establishes a tunnel for delivering the virtualized traffic to the network tool(s) 408 regardless of where the network tool(s) 408 reside. However, when the visibility platform 402 is physical (e.g., the network visibility appliance is comprised of a physical programmable switch), the visibility platform 402 may establish a tunnel only for those network tool(s) 408 that are hosted remotely (e.g., are not directly coupled to the visibility platform 402 using physical cables).

A "tunnel" is a mechanism that can be used to reliably transmit traffic across a network. Before virtualized traffic is forwarded to the tunnel by the visibility platform 402 for transmission to the network tool(s) 408, the visibility platform 402 may create an outer jacket for the virtualized traffic (and any other network content) based on the type of tunnel. For example, an inner payload could be wrapped in an encapsulation by the visibility platform 402 in accordance with a Virtual Extensible LAN (VXLAN) protocol or a Generic Routing Encapsulation (GRE) protocol. The network tool(s) 408 can then remove the outer jacket upon reception and determine how the inner payload (i.e., the actual virtualized traffic) should be handled.

As further described below, the visibility platform 402 can exist as a cloud-native virtual machine (also referred to as an "unnative virtual machine") that analyzes virtualized traffic traversing the cloud computing platform 400. Accordingly, the visibility platform 402 may not be limited by the computer hardware responsible for supporting the cloud computing platform 400.

Figure 5:
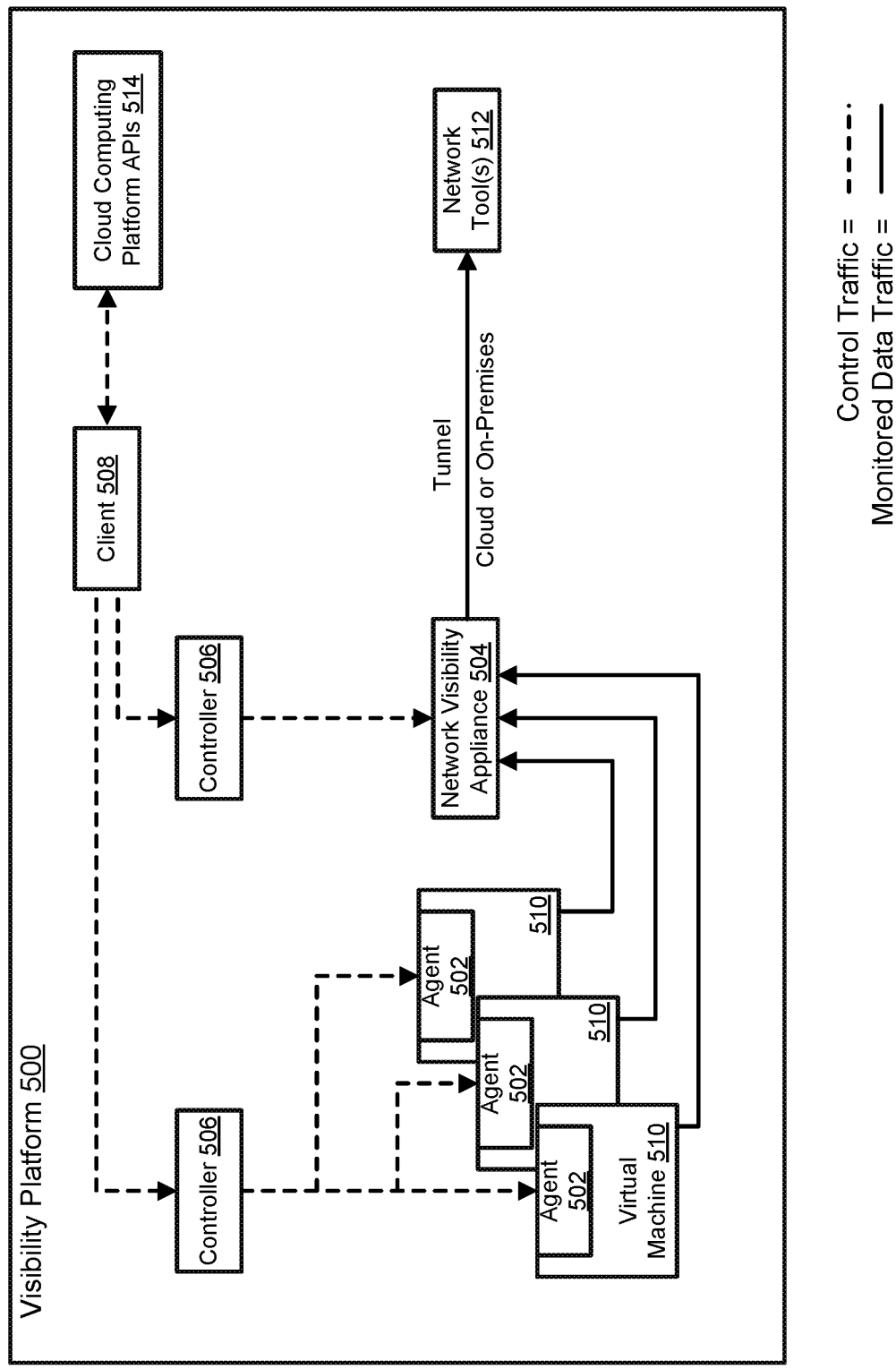
FIG. 5 depicts one embodiment of a visibility platform that can be run entirely within a cloud environment or a non-cloud environment (e.g., as a virtual machine).

FIG. 5 depicts one embodiment of a visibility platform 500 that can be run entirely within a cloud environment or a non-cloud environment (e.g., as a virtual machine). Thus, the visibility platform 500 may be hosted on a cloud computing platform, run on a dedicated piece of computer hardware (e.g., a monitoring platform that includes a chassis and interchangeable blades offering various functionalities, such as enhanced packet distribution and masking/filtering capabilities), or some combination thereof. For example, the visibility platform 500 could include a network visibility appliance 504 that resides on a stand-alone personal computer, a dedicated network server, or some other computing device having an x86 instruction set architecture.

It is often desirable to run the network visibility appliance 504 as a virtual machine on the cloud computing platform (e.g., cloud computing platform 400 of FIG. 4). For example, the visibility platform 500 may exist inside of a Virtual Private Cloud (VPC) that resides within a dedicated section of an end user's virtual network within Amazon Web Services. Such an arrangement permits the visibility platform 500 to intelligently optimize, filter, and analyze virtualized traffic across hundreds or thousands of virtual machines. Note, however, that the visibility platform 500 may also exist outside of the VPC.

Several advantages exist when the visibility platform 500 is deployed on the cloud computing platform. For example, additional computing devices and/or virtual machines can be seamlessly added in a dynamic fashion to increase the number of virtual central processing units (CPUs) (also referred to as "processors"), add storage devices, etc. Similarly, these computing device(s) and/or virtual machine(s) can be easily removed when they are no longer needed. Virtual implementation also enables the visibility platform to take advantage of any software or hardware acceleration techniques implemented by the provider or the end user. For example, the visibility platform 500 can leverage PCI pass-through if supported by the cloud provider and enabled by the end user and/or the security entity.

The visibility platform 500 includes one or more agents 502 for mirroring virtualized traffic traversing a cloud computing platform, a network visibility appliance 504 for aggregating and filtering the virtualized traffic, one or more controllers 506, and a client 508 for managing the visibility platform 500 as a whole. Other embodiments may include a subset of these components.

As shown here, each agent 502 is fully contained within a corresponding target virtual machine 510 whose virtualized traffic is to be monitored. While the agent(s) 502 serve requests issued by the controller(s) 506, each agent 502 may be responsible for configuring its own interface mirrors, tunnels, etc.

The network visibility appliance 504 can include a programmable switch (also referred to as a "switching engine"). The programmable switch may be a physical switch or a virtual switch, such as a software-defined networking (SDN) switch. The network visibility appliance 504 is responsible for aggregating virtualized traffic mirrored by the agent(s) 502, and then forwarding at least some of the aggregated virtualized traffic to one or more network tools 512 for further analysis. In some embodiments, the network visibility appliance 504 filters (e.g., slices, masks, or samples) and/or replicates the aggregated virtualized traffic before forwarding it downstream to the network tool(s) 512.

The controller(s) 506, meanwhile, may be controllable by the end user via the client 508, which may be hosted on the cloud computing platform on in an on-premises computing environment controlled by the end user. In some embodiments a single controller 506 is configured to control the agent(s) 502 and the programmable switch 504, while in other embodiments multiple controllers 506 are configured to control the agent(s) 502 and the network visibility appliance 504. Here, for example, a first controller controls the agent(s) 502 and a second controller controls the network visibility appliance 504. However, each agent 502 could also be associated with a dedicated controller.

Together, the client 508 and the controller(s) 506 enable centralized management of the visibility platform 500 as a whole. For example, the client 508 may be configured to integrate with one or more APIs 514 offered by the cloud computing platform in order to retrieve relevant information about the virtualized traffic being monitored (e.g., end user credentials, virtual machine addresses, virtualized traffic characteristics). As further described below, in some embodiments the client 508 supports a drag-and-drop user interface that can be used by the end user to create and implement traffic policies. Moreover, the client 508 may provide traffic policy statistics to the end user or an administrator (e.g., the manager of the visibility platform 500) for troubleshooting in real time.

Figure 6:
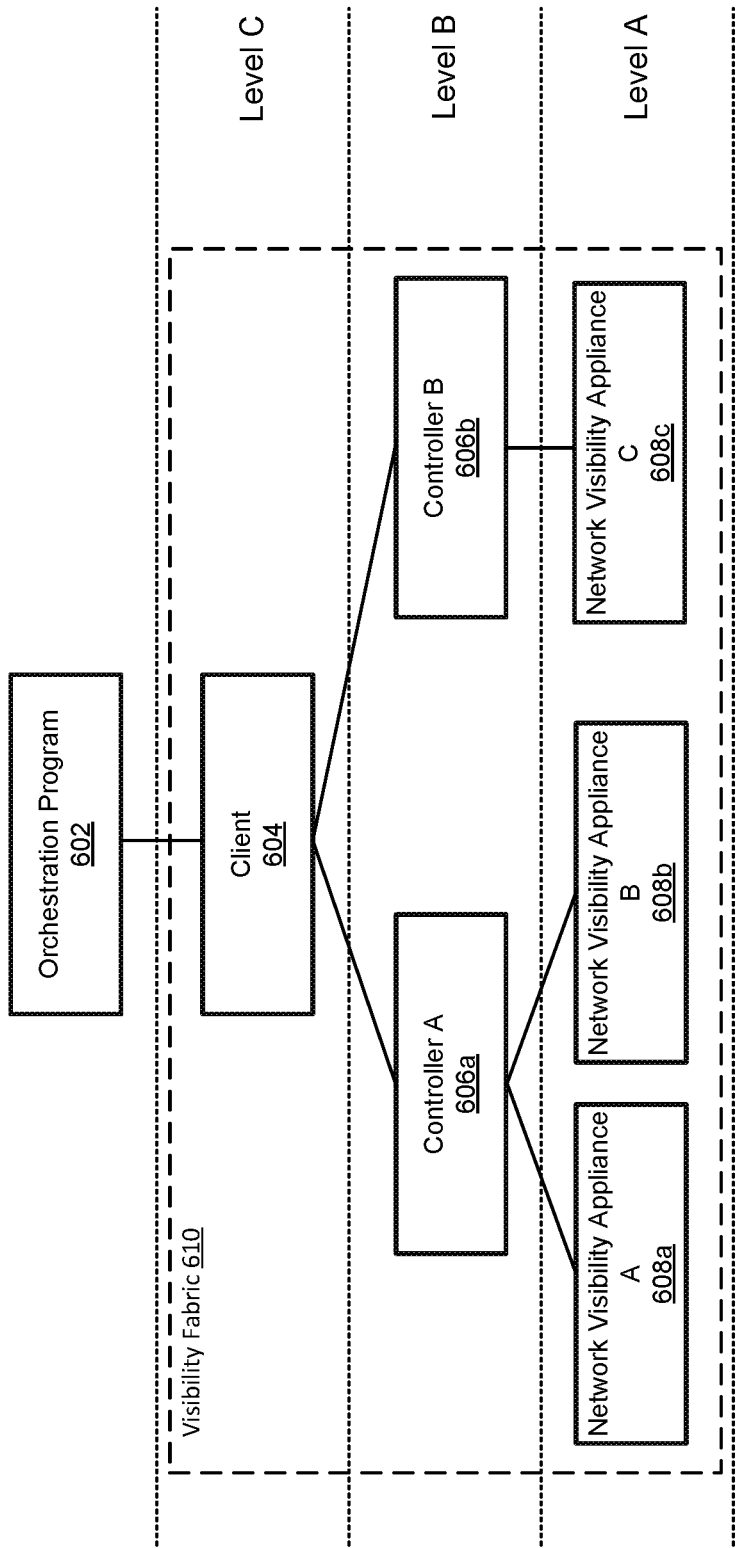
FIG. 6 depicts one embodiment of a visibility fabric being monitored by a visibility platform.

FIG. 6 depicts one embodiment of a visibility fabric 610 being monitored by a visibility platform. The visibility platform may be described as a hierarchy that has different layers. Here, for example, the visibility platform includes a client 604, one or more controllers 606a-b, and one or more network visibility appliances 608a-c.

Data would typically need to be translated as it travels from one level to the next. However, one benefit of the visibility platforms introduced here is the ability to control these multiple layers in the hierarchy with a consistent language/model. Consequently, changes can be readily made to a specified level of the hierarchy (e.g., adding more network visibility appliances, adding intelligence to certain layer(s), or adding new layers) without affecting the visibility platform as a whole.

The network visibility appliances 608a-c can be associated with specified target(s) that are being monitored. For example, network visibility appliance A 608a may examine traffic traversing a first virtual machine, network visibility appliance B 608b may examine traffic traversing a second virtual machine, and network visibility appliance C 608c may examine traffic traversing a third virtual machine. The network visibility appliances 608a-c can be referred to as the "leaf nodes" in the hierarchy. Thus, each leaf node represents an actual appliance that is responsible for completing a task (e.g., uploading traffic).

The controller(s) 606a-b can issue instructions to the network visibility appliances 608a-c. While each network visibility appliance may be communicatively coupled to a controller, each network visibility appliance need not be managed by a dedicated controller. Here, for example, controller A 606a manages network visibility appliance A 608a and network visibility appliance B 608b, while controller B 606b manages network visibility appliance C 608c.

The controller(s) 606a-b may be controllable by an end user via the client 604 (also referred to as a "visibility fabric manager"). More specifically, the client 604 may be responsible for producing/supporting a user interface through which the end user can manage individual network visibility appliances (e.g., filtering criteria) and/or the visibility fabric 610 as a whole. In some embodiments, the client 604 is communicatively coupled to an orchestration program 602. The orchestration program 602 may facilitate interactions between the client 604 of the visibility platform and other computing devices (e.g., by interfacing with certain APIs, operating systems, etc.).

Figure 7:
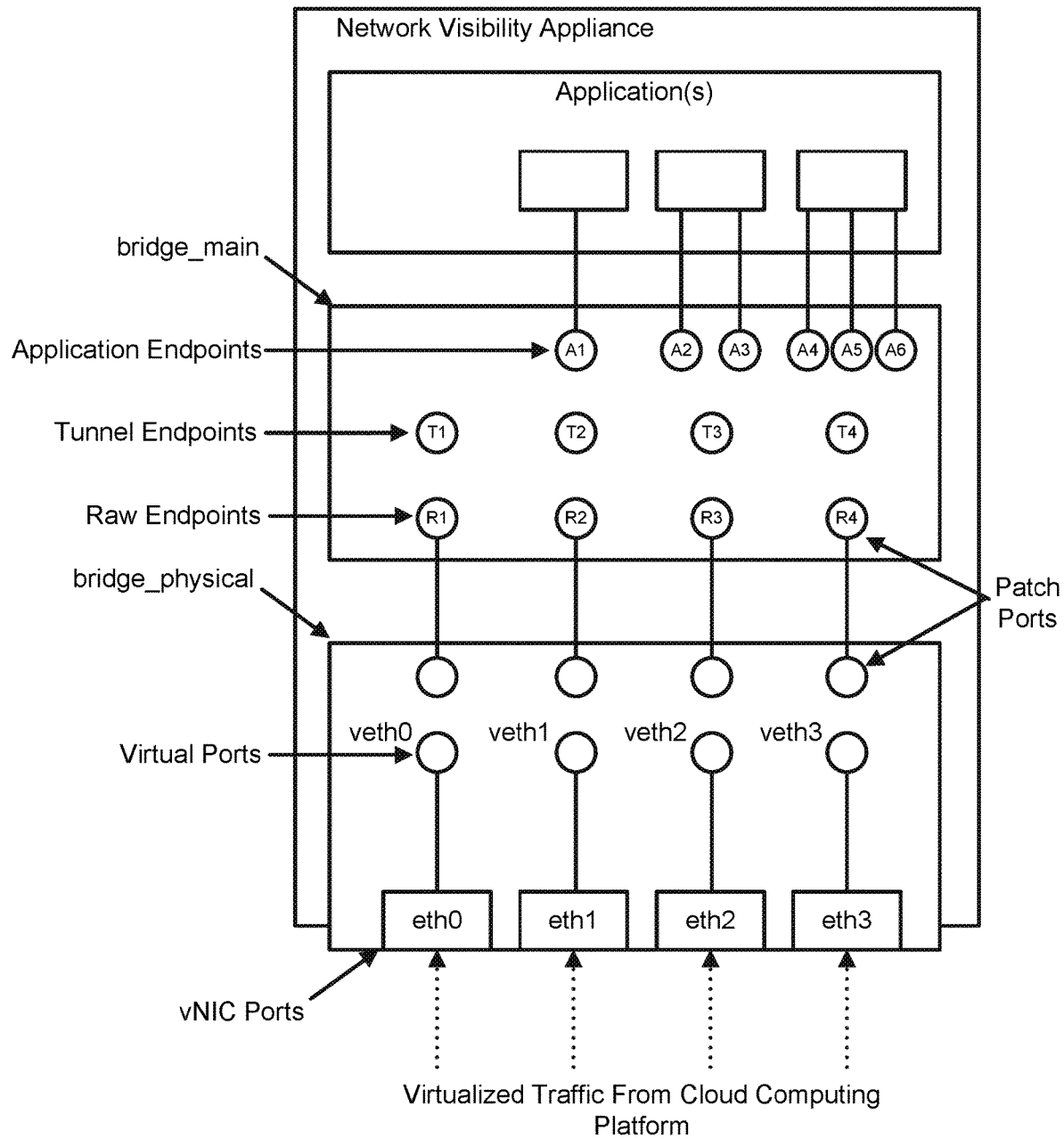
FIG. 7 depicts one embodiment of a network visibility appliance that may be executed by a visibility platform.

FIG. 7 depicts one embodiment of a network visibility appliance that may be executed by a visibility platform. The network visibility appliance can include a programmable switch (also referred to as a "switching engine") that facilitates the routing of traffic through the network visibility appliance. Although several of the examples provided below are described in the context of virtual programmable switches (e.g., Open vSwitch, VMware NSX), the same techniques are equally applicable to physical programmable switches (e.g., a Broadcom packet processor).

The network visibility appliance includes one or more ports (e.g., eth0, eth1, eth2, and eth3) for receiving virtualized traffic that has been tapped or forwarded from a cloud computing platform. Each port represents a Network Interface Card (NIC) or virtual Network Interface Card (vNIC). In the case of a virtual programmable switch, each port is created, cleared, and/or deleted by an API. Said another way, a new network visibility appliance including a virtual programmable switch will not have any ports upon installation. Instead, the port(s) must be dynamically created by the programmable switch and an API is assigned to each port. A physical programmable switch includes a fixed number of ports, though additional ports could be added by installing a new blade or card within the physical programmable switch. Thus, the programmable switch will have one or more (v)NICs regardless of whether the programmable switch is implemented in software or physical hardware.

The network visibility appliance manages virtualized traffic coming into these port(s) using rules (also referred to as "flow entries" or "access control lists") that dictate whether incoming virtualized traffic should be dropped or routed to another node within the visibility fabric (e.g., another network visibility appliance). These rules are typically maintained within a programmable data structure (e.g., a flow table) that is accessible to the programmable switch. Generally, the data structure is exposed to a controller (e.g., controller 506 of FIG. 5) that can be used to insert, remove, and/or modify filters or flows.

In order to properly route incoming virtualized traffic, the programmable switch (e.g., Open vSwitch or VMware NSX for virtual embodiments, Broadcom packet processor for physical embodiments) must be compatible with the port(s) and have access to a programmable data structure (e.g., a flow table). When the programmable switch is implemented entirely in software, the programmable data structure can be represented as a series of flow tables. Unlike physical programmable switches, virtual programmable switches are not limited to a single data structure (e.g., a single ternary content-addressable memory (TCAM)). Software implementation permits rules to be intelligently distributed across multiple virtual programmable switches. Different flow tables may include different types of information.

As shown in FIG. 7, in some embodiments the programmable switch is split into multiple bridges (e.g., bridge_physical and bridge_main). The presence of multiple bridges will typically simplify the underlying architecture of the network visibility appliance (and the relationship between various ports of the network visibility appliance). However, the programmable switch need not be split into multiple bridges. In fact, in some instances it may be desirable to work with a single bridge.

Each virtual port (e.g., veth0, veth1, veth2, and veth3) created by the network visibility appliance can be given a unique Internet Protocol (IP) address for management purposes. Generally, a programmable switch will not assign IP addresses to any physical ports because they could be (and often are) shared by multiple virtual machines. After unique IP addresses have been assigned to the virtual port(s), the network visibility appliance can completely ignore whether physical ports exist. Instead, the programmable switch can interface directly with the virtual port(s) constructed by API(s).

In some embodiments, the network visibility appliance is communicatively coupled to a controller (e.g., controller 506 of FIG. 5) across a network. The controller could be, for example, a remote SDN controller (e.g., OpenDaylight) that implements traffic policies within the network visibility appliance. Together with a client (e.g., client 508 of FIG. 5), the controller may allow an end user or an administrator to manage multiple network visibility appliances (and thus multiple virtual machines or physical computing devices).

The network visibility appliance of which the programmable switch is a part may also include one or more applications for creating, aggregating, filtering, and/or modifying traffic. Each application may reside within a separate program container when the network visibility appliance is constructed in Linux. In such embodiments, each program container can be communicatively coupled to a bridge (e.g., bridge_main) that is responsible for routing incoming traffic to the appropriate application(s).

FIG. 7 depicts several different kinds of network objects (e.g., raw endpoints, tunnel endpoints, application endpoints, and/or maps) that allow the network visibility appliance to monitor virtualized traffic. More specifically, the network visibility appliance may be configured to filter virtualized traffic (e.g., selecting virtualized traffic of interest by matching against specified criteria defined in maps), manipulate virtualized traffic (e.g., by performing operations such as slicing, masking, de-duplication, and compression), and/or transport virtualized traffic (e.g., by receiving and dispatching virtualized traffic to network tool(s) for further analysis).

A network visibility appliance may include one or more raw endpoints (e.g., R1, R2, R3, and R4) that receive traffic directly from corresponding (v)NICs. The network visibility appliance may also include one or more tunnel endpoints (e.g., T1, T2, T3, and T4) that send/receive traffic to/from remote locations. Examples of remote locations include other network visibility appliances, on-premises computing environments, etc. Tunnel endpoints can be created by the network visibility appliance using APIs, and tunnel endpoints are typically associated with both a remote endpoint and a specific type (e.g., VXLAN or GRE).

The network visibility appliance may also include one or more application endpoints (e.g., A1, A2, A3, A4, A5, and A6) that send/receive packets to/from application programs (also referred to as "applications"). Applications may be responsible for creating, aggregating, filtering, and/or modifying the virtualized traffic received by the network visibility appliance. Examples of applications can include masking programs, deep packet inspection programs, net flow generation programs, etc.

The network visibility appliance can receive virtualized traffic at raw endpoints, tunnel endpoints, and application endpoints, and the network visibility appliance can output virtualized traffic at tunnel endpoints and application endpoints. Raw endpoints, therefore, can only receive incoming virtualized traffic, while tunnel endpoints and application endpoints are generally bi-directional (i.e., can receive and transmit virtualized traffic across different ingress and egress interfaces).

Raw endpoints are illustrated as the lowermost endpoints in FIG. 7 because they receive virtualized traffic directly from the (v)NICs. However, tunnel endpoints are often the predominant way to route virtualized traffic away from the network visibility appliance (e.g., into an on-premises environment that includes one or more network tools). Although application endpoints route virtualized traffic into an environment managed by an application, the environment still typically resides within the network visibility appliance as shown in FIG. 7.

Graph-Based Network Fabric for a Network Visibility Appliance

As noted above, a client (e.g., client 508 of FIG. 5) can be communicatively coupled to a network visibility appliance (e.g., network visibility appliance 504 of FIG. 5). In some embodiments, the client supports a user interface (e.g., a drag-and-drop user interface) that enables an end user to modify the visibility fabric of the network visibility appliance.

Figure 8:
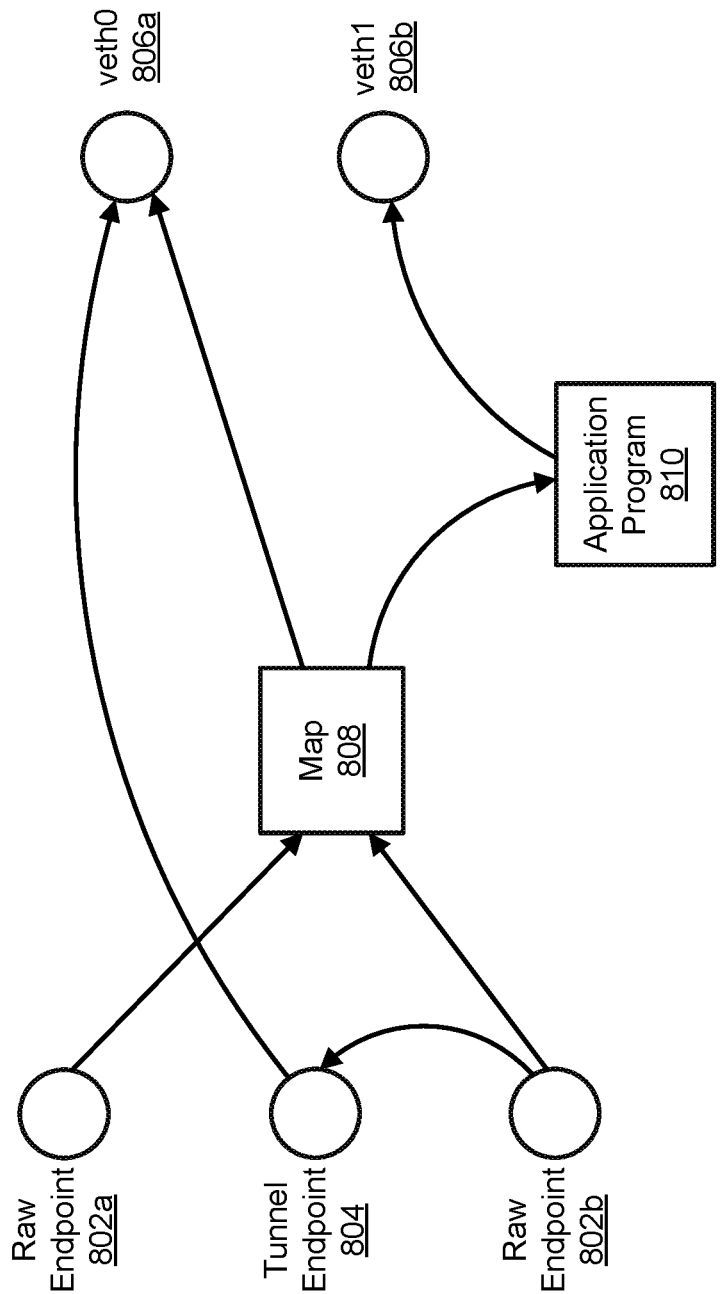
FIG. 8 depicts a graph that represents the network fabric of a network visibility appliance.

FIG. 8 depicts a graph that represents the network fabric of a network visibility appliance. When the network fabric of the network visibility appliance is represented as a graph, an end user can easily modify the network fabric, for example, by adding/removing network objects and/or rerouting traffic by modifying connections between pairs of network objects.

A graph is a collection of nodes that are connected with edges (also referred to as "connections"). Here, the nodes represent separate network objects (e.g., a raw endpoints, tunnel endpoints, application endpoints, or maps) and the connections illustrate how traffic flows between these network objects. In some embodiments, each traffic flow includes data packets processed by a virtual machine that is communicatively coupled to the network visibility appliance.

Generally, the graph is modeled as a directed acyclic graph (DAG), which is a directed graph having no cycles. A DAG is formed from a topological sequence of nodes such that there is no path starting at a given node that eventually loops back to the given node. DAGs are preferred for representing visibility fabrics because loops are bad for networks (e.g., traffic may continually be pushed around while consuming bandwidth). Although the usefulness of individual graphical representations may be limited in some instances, network solutions can be more easily designed and built using the graphical representations described herein.

The nodes in a graph can represent several different kinds of network objects, including:
  Raw endpoints that receive traffic from (v)NICs;
  Tunnel endpoints that send/receive traffic to/from remote locations (e.g., those outside of the visibility platform);
  Maps representing packet filters that can be applied to the data packets that form the traffic; and
  Application endpoints that send/receive traffic to/from application programs.

The connections depict how traffic flows amongst the nodes. The connections serve as links to connect the network objects in the desired manner. As noted above, the properties of the DAG prevent loops from being formed. Thus, each connection may be a directed edge that indicates traffic only flows in one direction.

Here, for example, traffic enters the network visibility appliance at two raw endpoints 802*a-b* and a tunnel endpoint 804. Raw endpoints are generally the first node(s) in the graph because they receive traffic directly from (v)NICs. Traffic received at the tunnel endpoint 804 is routed directly to veth0 806*a* (i.e., a virtual port). Traffic received at raw endpoint 802a is routed to a map 808, while traffic received at raw endpoint 802b routed to both the tunnel endpoint 804 and the map 808.

Data packets can be replicated as necessary when leaving a network object corresponding to a node having multiple outgoing connections. For instance, data packets leaving the raw interface 802b can be duplicated so that identical traffic streams are routed to the tunnel endpoint 804 and the map 808.

The map 808 allows the network visibility appliance to select traffic of interest by matching against specified criteria defined in the map 808. For example, traffic satisfying a first specified criterion can be routed to veth0 806a, and traffic satisfying a second specified criterion can be routed to an application program 810, which forwards at least some of the traffic to veth1 806b (i.e., another virtual port).

Accordingly, a network visibility appliance including a processor and an ingress interface (at which data packets are received) can identify a sequence of network objects through which a traffic flow received at the ingress interface should be routed, and then route the traffic flow through the sequence of network objects in accordance with a graph defining the network fabric of the network visibility appliance.

A single graph can be used to represent all of the active service chains within a visibility fabric (which may span a single visibility platform or multiple visibility platforms). Moreover, because the graph is constructed from nodes and connections, an end user (e.g., a network administer) can readily use the connections as links to connect the network objects in any desired manner. Thus, the end user may use the graph to more easily manage traffic flowing across cloud architectures and/or non-cloud architectures. For example, the end user may review the graph on a user interface and modify the traffic route(s) by drawing connections between nodes, deleting existing connections, etc. The visibility fabric represented by the graph can be dynamically altered whenever nodes/connections are added, removed, or modified.

Figure 9:
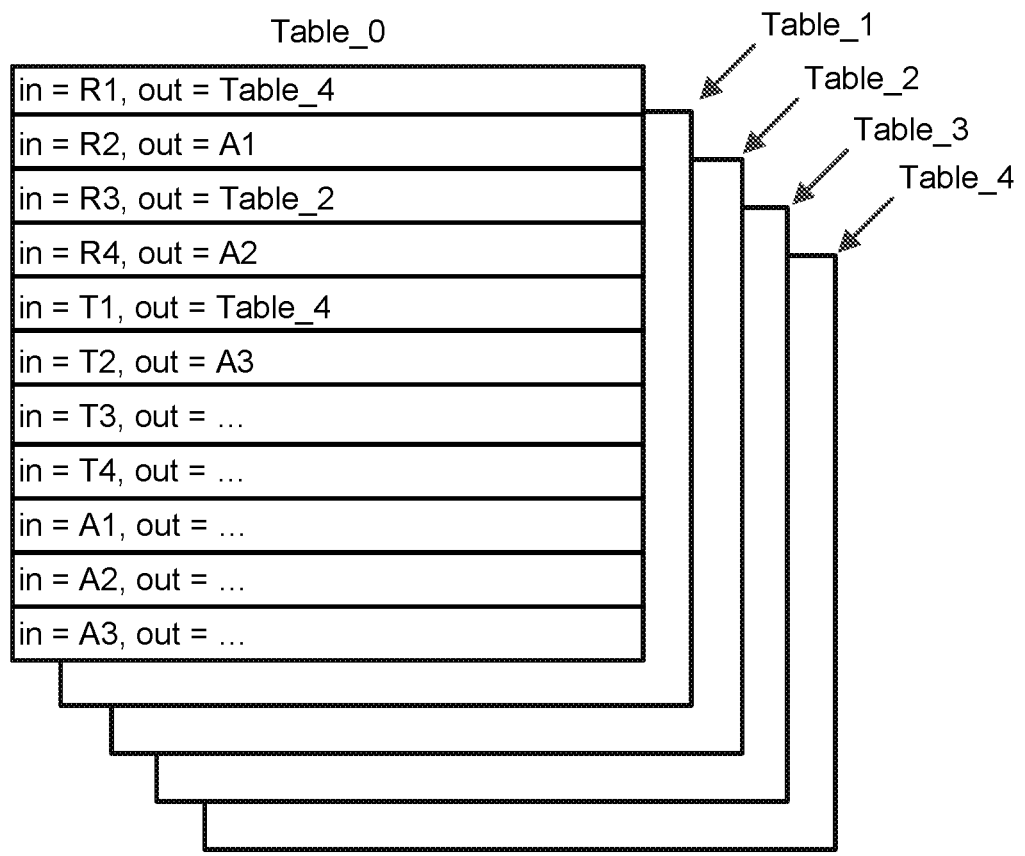
FIG. 9 depicts an example of a series of programmable flow tables that can be used by a network visibility appliance (and, more specifically, a programmable switch) to route traffic.

FIG. 9 depicts an example of a series of programmable flow tables that can be used by a network visibility appliance (and, more specifically, a programmable switch) to route traffic. Each network object capable of receiving incoming traffic (i.e., each raw endpoint, tunnel endpoint, and application endpoint) is represented by a row in Table_0. These network objects can also be referred to as possible "ingress interfaces" or "ingress points." Table_0 is responsible for initially routing all incoming traffic to a tunnel endpoint, an application endpoint, or a map (which requires the corresponding entry list another table). In some embodiments, the network visibility appliance maintains statistics regarding how traffic is routed between the various network objects.

Figure 10:
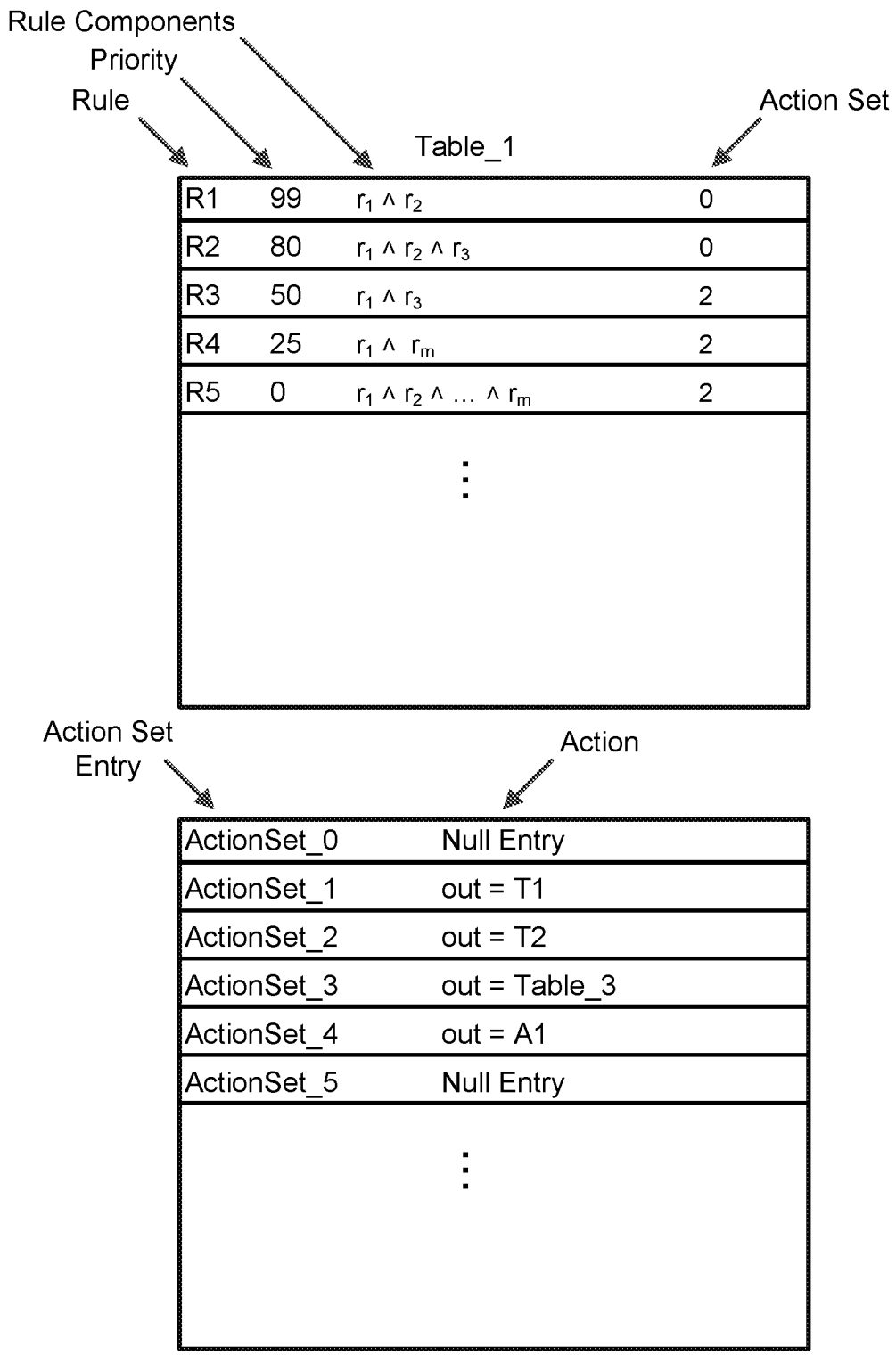
FIG. 10 depicts an example of a programmable flow table for a map.

Each map is represented by its own table (e.g., Table_1, Table_2, Table_3, and Table_4). FIG. 10 depicts an example of a programmable flow table for a map. The number of lines in the programmable flow table (which is generally on the order of hundreds or thousands) defines how many rules are allowed in the map.

Maps represent packet filters that can be applied to data packets. A map (M) is a collection of one or more rules that is considered a "match" if any of the rules has a match.

$$M = R_1 \lor R_2 \ldots \lor R_n$$

A rule (R) includes one or more rule components that must be simultaneously satisfied.

$$R = r_1 \land r_2 \land \ldots \land r_m$$

A rule component (r) is a specific filtering criterion for matching packets (e.g., based on address, protocol, source port, destination port, or some other packet criteria).

As shown in FIG. 10, the programmable flow table can specify what will happen if any of the rules (e.g., R1, R2, R3, R4, or R5) result in a match. The outcome (also referred to as an "action set") may specify, for example, that matching data packets should be dropped or routed to a specific network object (e.g., a tunnel endpoint, an application endpoint, or another map).

FIG. 10 also depicts an example of a programmable flow table that includes the action sets for a map. An action set is a group of one or more actions that are applied together. Each action set can specify one or more different actions to be performed if application of a corresponding rule results in a match. If the action set is an empty set or a null set (i.e., does not include an affiliated action), then the programmable switch treats the action set as a conclusive drop rule. Accordingly, all matching data packets are dropped by the programmable switch.

The action set may list a node corresponding to a tunnel endpoint or an application endpoint. Here, for example, ActionSet_4 lists node A1 (which corresponds to an application endpoint). In such instances, the programmable switch directs matching data packets to the specified node, which causes the matching data packets to once again be governed by Table_0. The action set may also specify that matching data packets should be forwarded to another table corresponding to another map. Here, for example, ActionSet_3 causes traffic to be forwarded to Table_3, which represents another map. Traffic can be replicated as necessary when leaving a node that has more than one outgoing connection (e.g., when the action set specifies multiple destinations).

Multiple rules may be associated with a single action set. Here, for example, rule one (R1) and rule two (R2) are affiliated with ActionSet_0, while rule three (R3), rule four (R4), and rule five (R5) are affiliated with ActionSet_2. Generally, these links to action sets are fixed once the map has been constructed and programmed into the programmable switch. However, because each map is assigned to its own table, an end user may be able to easily add, remove, or modify maps by adding new tables, removing existing tables, or modifying entries in existing tables.

In some embodiments, each rule is assigned a specific priority. Priorities can range from 0-99, where a larger number denotes a higher priority. Higher priority rules can then be evaluated before lower priority rules. In some embodiments no specific execution order may be guaranteed for rules having the same priority, while in other embodiments rules having the same priority are executed in the order in which they reside in the programmable flow table.

The links described above between the various programmable flow tables are generally simple, passive links. However, the links could be made more intelligent. For example, the programmable switch may add quality of service (QoS) policies to certain links, stamp incoming data packets with particular metadata (e.g., a timestamp or unique identifier), modify the IP addresses of outgoing data packets, etc.

Note that the same techniques could be implemented using a single table that is partitioned into multiple (logical) zones. For example, a first group of rows may be allocated to the network objects capable of receiving incoming virtualized traffic, a second group of rows may be allocated to a first map, and a third group of rows may be allocated to a second map.

The programmable flow tables shown in FIGS. 9-10 can be programmed (e.g., by a network visibility appliance, client, or controller) using the graph. For example, the programmable flow tables may be automatically populated responsive to determining the graph has been finalized by the end user. In some embodiments, the programmable flow tables are made accessible (i.e., exposed) to a controller that is able to dynamically add, delete, and/or modify entries in real time as the graph is altered by the end user.

Figure 11:
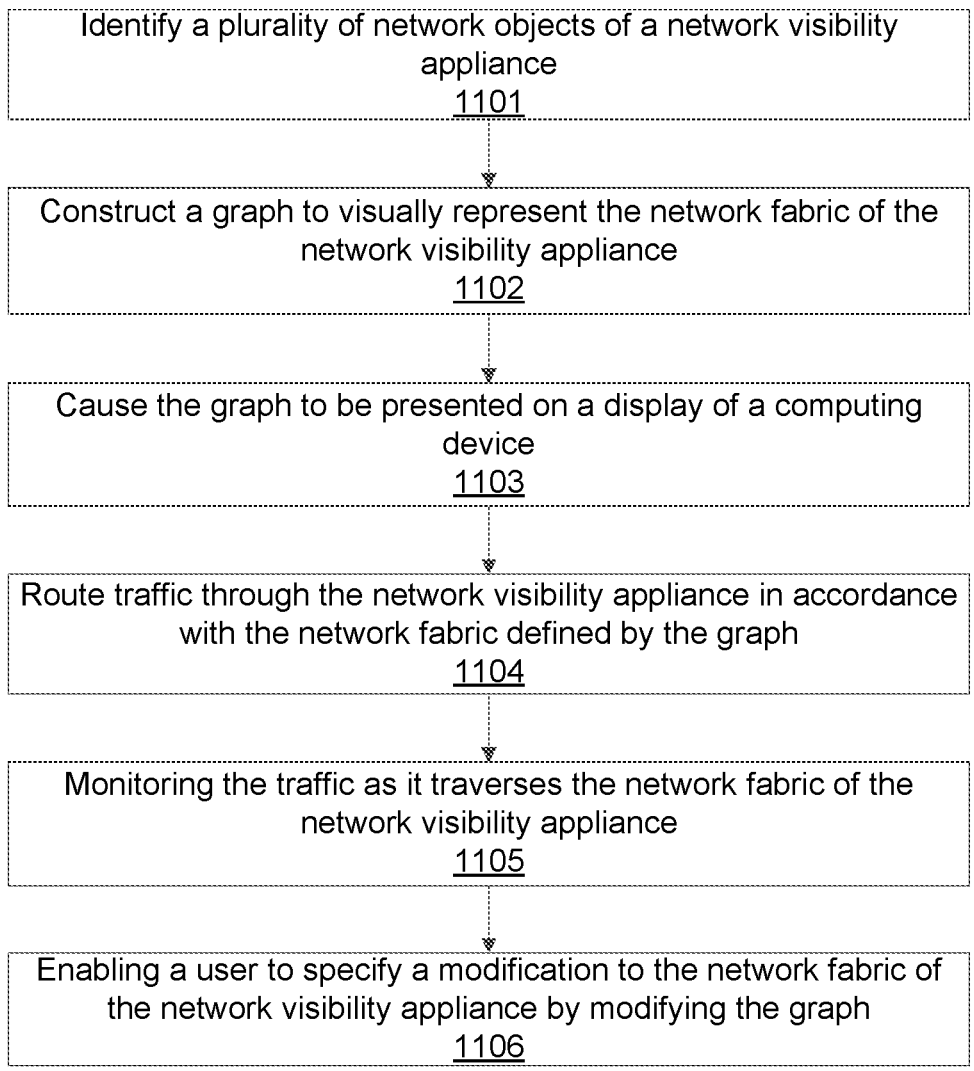
FIG. 11 depicts a process for modeling the network fabric of a network visibility appliance.

FIG. 11 depicts a process 1100 for modeling the network fabric of a network visibility appliance. A client can initially identify a plurality of network objects of a network visibility appliance (step 1101). The plurality of network objects can include raw endpoint(s), tunnel endpoint(s), application endpoint(s), and/or map(s). In some embodiments, the plurality of network objects includes every network object of the network visibility appliance.

The client can then construct a graph to visually represent the network fabric of the network visibility appliance (step 1102). Each network object of the plurality of network objects can be displayed as a node in the graph, while traffic flows between pairs of network objects can be displayed as edges (also referred to as "connections") between pairs of nodes in the graph.

The client can then cause the graph to be presented on a display of a computing device (step 1103). For example, an end user (e.g., a network administrator) may wish to view the graph to see how traffic is being routed through the network visibility appliance.

The network visibility appliance can then route traffic in accordance with the network fabric defined by the graph (step 1104). In some embodiments, the traffic is monitored as it traverses the network fabric of the network visibility appliance (step 1105). For example, the network visibility appliance could generate statistics regarding how the traffic is routed between the plurality of network objects. Such statistics may be useful to identify bottlenecks in the network fabric, the popularity of certain traffic types, etc.

The client may also enable the end user to specify a modification to the network fabric of the network visibility appliance by modifying the graph (step 1106). For example, the end user could add a new node/connection, delete an existing node/connection, and/or alter a characteristic of an existing node/connection. In such instances, the client may transmit a notification specifying the modification to a controller responsible for causing the modification to be implemented by the network visibility appliance.

Dynamic Service Chaining and Late Binding

A service chain refers to a set of network services that are interconnected through a network fabric to support a particular application. Thus, service chaining refers to the provisioning of network services for the particular application.

Figure 12:
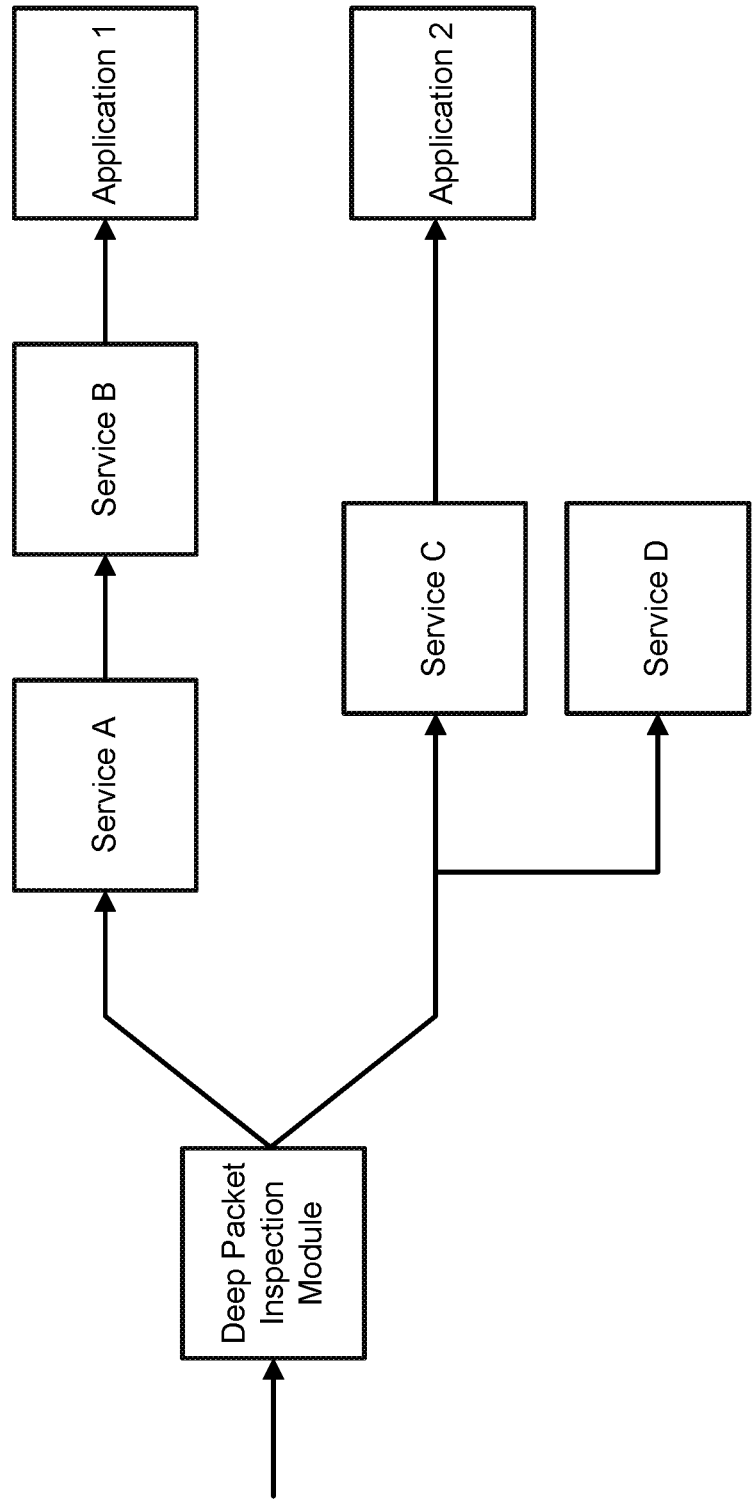
FIG. 12 depicts how network services can be provisioned in a serial or parallel fashion.

As shown in FIG. 12, these network services can be provisioned in a serial or parallel fashion. Service chaining can be used to ensure that traffic streams skip unnecessary network services and receive only those network services that are needed. For example, an email service chain may include virus, span, and phishing detection, while a video streaming service chain may include traffic shaping policies to satisfy QoS guarantees. One or more characteristics of a traffic stream may be used to determine which network service(s) are appropriate. Examples of traffic characteristics include traffic protocol, origination source, destination source, data packet type, data packet header content, data packet payload content, etc.

Network services are often implemented by applications and/or network tools that are communicatively to a network visibility appliance of a visibility platform. However, network services could also be implemented by, for example, firewalls or application delivery controllers (ADCs). Because the network fabric of the network visibility appliance can be represented as a graph (e.g., a DAG) that makes use of action sets, service chains can be readily created, destroyed, and modified on demand. This makes the processes of network management and application replacement/upgrade easier.

As noted above, each node of the graph can be affiliated with an action set (i.e., a group of one or more actions that are applied together). Multiple types of actions may be supported by a network visibility appliance, including: (1) dropping some or all of the traffic; and (2) directing the traffic to another network object represented as another node in the graph.

When dealing with the type of graph shown in FIG. 8, it is often desirable for the graph to be dynamically editable. Static graphs are generally not very useful when dealing with networks that constantly change over time. In fact, if a network includes hundreds or thousands of separate nodes (e.g., raw endpoints, tunnel endpoints, application endpoints, and/or maps), a static graph is likely to only be useful for a short period of time because network analysis/filtering requirements change and an end user may want to alter the graph.

Figure 13:
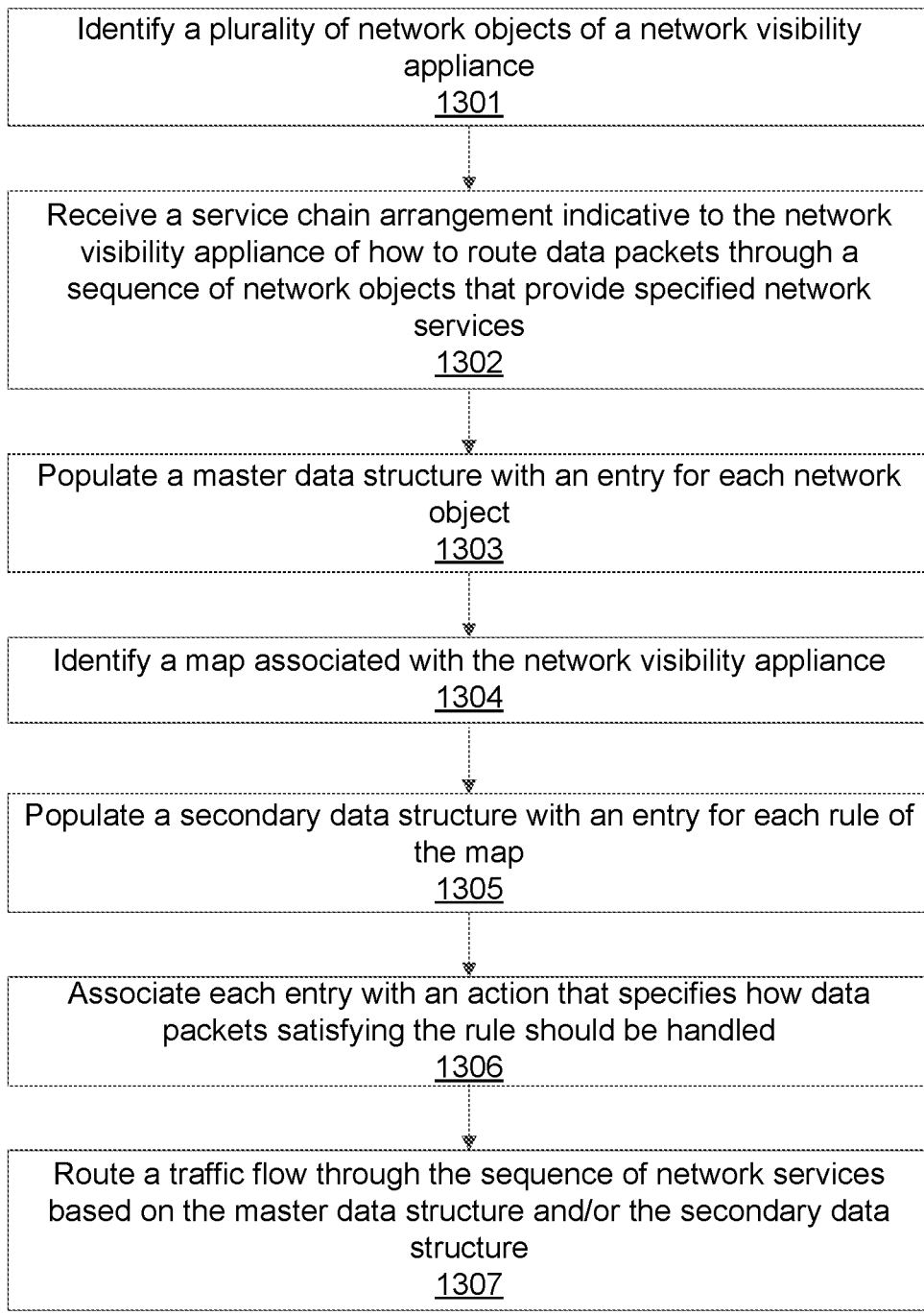
FIG. 13 depicts a process for dynamically programming data structure(s) such that a traffic flow is routed through a series of network service(s).

FIG. 13 depicts a process 1300 for dynamically programming data structure(s) such that a traffic flow is routed through a series of network service(s). A client initially identifies a plurality of network objects of a network visibility appliance (step 1301). The plurality of network objects can include raw endpoint(s), tunnel endpoint(s), application endpoint(s), and/or map(s).

The client can then receive a service chain arrangement indicative to the network visibility appliance of how to route data packets through a sequence of network object(s) that provide specified network service(s) (step 1302). Examples of network services include masking, slicing, sampling, replicating, deep packet inspection, net flow generation, access control, intrusion protection, network address translation (NAT), etc. Accordingly, the sequence of network object(s) will typically include application endpoint(s) that interface with application(s) and/or tunnel endpoint(s) that interface with network tool(s).

A controller can then populate a master data structure (e.g., programmable flow table) accessible to the network visibility appliance with an entry for each network object of the plurality of network objects (step 1303). Each entry in the master data structure can include a routing instruction that specifies where data packets received at the corresponding network object should be routed.

The client may also identify any maps associated with the network visibility appliance (step 1304). If a map is discovered, the client may cause the controller to populate a secondary data structure with an entry for each rule of the map (step 1305) and associate the entry with an action that specifies how data packets satisfying the corresponding rule should be handled (step 1306).

The network visibility appliance can then route a traffic flow through the sequence of network objects(s) using the master data structure and, if necessary, the secondary data structure(s) (step 1307).

Other steps may also be included in some embodiments. For example, the client could also cause a graph to be constructed that visually represents the network fabric of the network visibility appliance. In such embodiments, the graph can be presented on the display of a computing device associated with an end user, who may be able to dynamically change the sequence of network objects(s) by specifying a modification to the graph.

The end user may also wish to implement different maps over a certain time period. For example, the end user may wish to implement a map that separates incoming traffic into different protocols (e.g., Transmission Control Protocol (TCP) and User Datagram Protocol (UDP), or Hypertext Transfer Protocol (HTTP), Secure Shell (SSH), and File Transfer Protocol (FTP)). As another example, the end user may wish to implement a policy that states traffic corresponding to some endpoints (e.g., executives' traffic or legal department traffic) should not be tapped, while traffic corresponding to other endpoints (e.g., regular employees' traffic or engineering department traffic) should be routed to application(s) and/or network tool(s).

These maps could be built by the end user or some other entity (e.g., a provider, security entity, or another end user) and, as noted above, can be stored in separate programmable flow tables. Because the maps are entirely separate from one another, the architect of the first map need not know that the second map even exists (and vice versa). Such an arrangement allows the end user and/or the architect to make changes to one map without affecting any other maps that could be implemented by a network visibility appliance.

In some embodiments, the architect may design a map without being concerned about how the map will subsequently be used. For example, a map may be designed to filter out all traffic of a certain type (e.g., traffic corresponding to a specific service, such as Netflix). Independence allows maps to be designed on a micro level without needing to know how the maps are going to be used (also referred to as the "intended use") on a macro level. Each map, therefore, can be treated as a packet-classifying engine.

In some embodiments, maps produced by different architects are hosted within a map library. The map library may include, for example, maps for separating internal traffic from external traffic, traffic having different protocols, traffic having different priority measures, etc.

Figure 14:
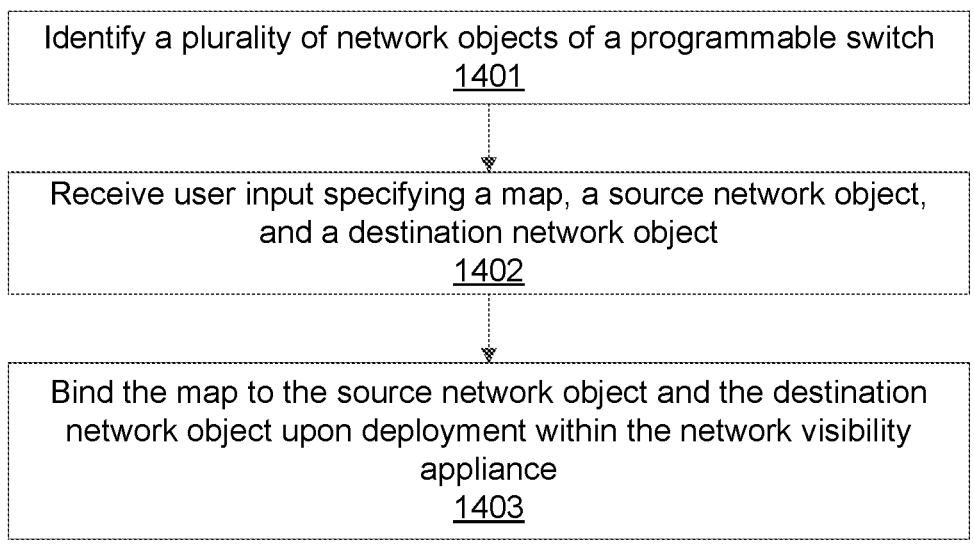
FIG. 14 depicts a process for dynamically binding a map to a network visibility appliance prior to runtime.

The end user (or some other network orchestrator) may be able to implement a map stored in the map library using a graph that defines the visibility fabric of a network visibility appliance. FIG. 14, for example, depicts a process 1400 for dynamically binding a map to a network visibility appliance prior to runtime.

A client may initially identify a plurality of network objects of the network visibility appliance (step 1401). Generally, the plurality of network objects will include raw endpoint(s), tunnel endpoint(s), and/or application endpoint(s) that are accessible to the network visibility appliance.

The client can then receive user input specifying a map, a source network object that is to direct data packets to the map, and a destination network object that is to receive data packets from the map (step 1402). The map may be selected from a map library that includes multiple unbound maps (i.e., maps that were not bound to specific network objects during construction). The source network object may be one of multiple source network objects that are to direct data packets to the map. Similarly, the destination network object may be one of multiple destination network objects that are to receive data packets from the map. For example, the user input may specify that video traffic is to be directed to a first destination network object (e.g., a tunnel endpoint), while all other traffic is to be directed to a second destination network object (e.g., an application endpoint).

A controller can then bind the map to the source network object and the destination network object upon deployment within the network visibility appliance (step 1303). Said another way, the controller can associate the map with the source network object and the destination network object before the map is implemented (i.e., used) by the network visibility appliance. Binding may require that the controller dynamically edit an action set associated with a data structure (e.g., a programmable flow table) corresponding to the map. The data structure is accessible to the network visibility appliance, which can use the data structure to route traffic.

Accordingly, an end user may be able to readily implement maps by simply selecting a map and specifying the source node(s) and destination node(s) in a graph that defines the visibility fabric of the network visibility appliance. In some embodiments, the end user is also able to modify the template maps hosted in the map library.

Because maps in the map library are not bound to specific network object(s) during construction, late binding can be used to bind a map upon deployment. Note, however, that the network object(s) must be able to comply with certain restrictions (e.g., the node(s) corresponding to the network object(s) must be designed in a manner that permits late/dynamic binding). Dynamic binding is implemented by editing the action set(s) associated with each map. For example, the controller may modify an action set so that traffic is routed to another network object rather than being dropped.

When the graph permits dynamic binding, the end user has substantial flexibility to do various kinds of operations. Dynamic binding also allows the network visibility appliance to defer any decisions on what network object to call (e.g., a table representing a map or a table entry representing a raw endpoint, tunnel endpoint, or application endpoint) until the network object is actually needed. Thus, once dynamic binding is permitted and the binding can be changed at run time, the network visibility appliance can dynamically change service chains for handling the traffic.

Another advantage of the techniques described herein is that maps/filters can be programmed and network fabrics can be constructed by regular programmers using higher-level programming languages, such as C, Python, or Java. Said another way, the techniques described here facilitate the transition to higher-level programming languages for defining network filters, which has traditionally been a difficult and/or tedious process. For example, a map may be represented as a switch structure that permits rules to be easily affiliated with certain outcomes.

Distributed Visibility Fabric for Private, Public, and Hybrid Clouds

A visibility platform can include a network visibility appliance that may be implemented as a physical appliance (e.g., using a physical programmable switch such as a Broadcom packet processor) or a virtual machine (e.g., using a virtual programmable switch such as Open vSwitch or VMware NSX). However, a single visibility platform is generally not, by itself, very useful. Instead, better network visibility may be achieved by deriving traffic information from hundreds or thousands of visibility platforms.

Figure 15:
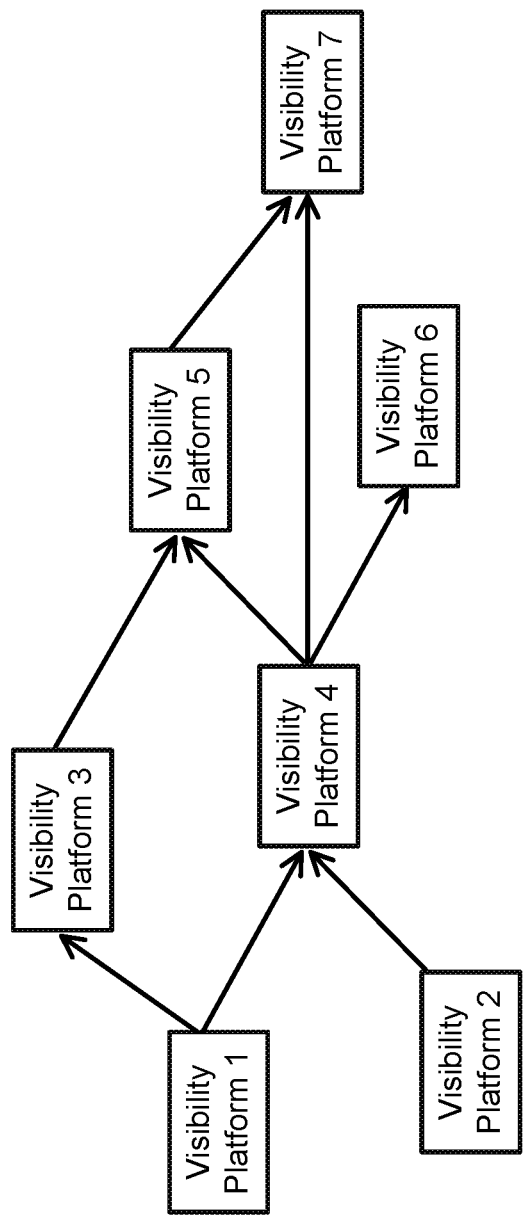
FIG. 15 depicts one example of a distributed visibility fabric that includes multiple visibility platforms.

FIG. 15 depicts one example of a distributed visibility fabric that includes multiple visibility platforms. An end user may interact with the distributed visibility fabric via a user interface, which can include a high-level representation of each visibility platform. The distributed visibility fabric may be visually represented as a DAG.

The end user (or a security entity) can then map the network objects of each visibility platform onto a series of network visibility appliances. More specifically, the network objects of each visibility platform can be mapped onto the programmable switch of each network visibility appliance. This allows certain network objects (e.g., maps) to be intelligently distributed amongst the series of network visibility appliances. In some embodiments, the network objects of each visibility platform are mapped onto the series of network visibility appliances on the end user's behalf (i.e., without requiring further user input).

If traffic must go from one node to another node (i.e., from one visibility platform to another visibility platform), the end user can cause the two nodes to be linked together to form an appropriate connection. Different network arrangements can be supported when network objects are automatically and intelligently mapped onto the series of network visibility appliances. For example, if a programmable switch of a network visibility appliance ceases to operate, the network object(s) associated with the programmable switch can be re-assigned to an operational programmable switch of another network visibility appliance. Other advantages provided by the distributed visibility fabric can be seen in the use cases described below.

A single visibility platform (e.g., the visibility platforms of FIGS. 3-4) can be used to provide pervasive visibility into the virtualized traffic traversing a cloud computing platform that is accessed by one or more agents and a programmable switch. Accordingly, the visibility platform can be used to provide greater clarity into the traffic within on-premises environments, private cloud environments, public cloud environments, hybrid cloud environments, and multi-virtual network deployments. The visibility platforms described here can be implemented in such a manner as to support numerous real-world, flexible deployment models.

Figure 16:
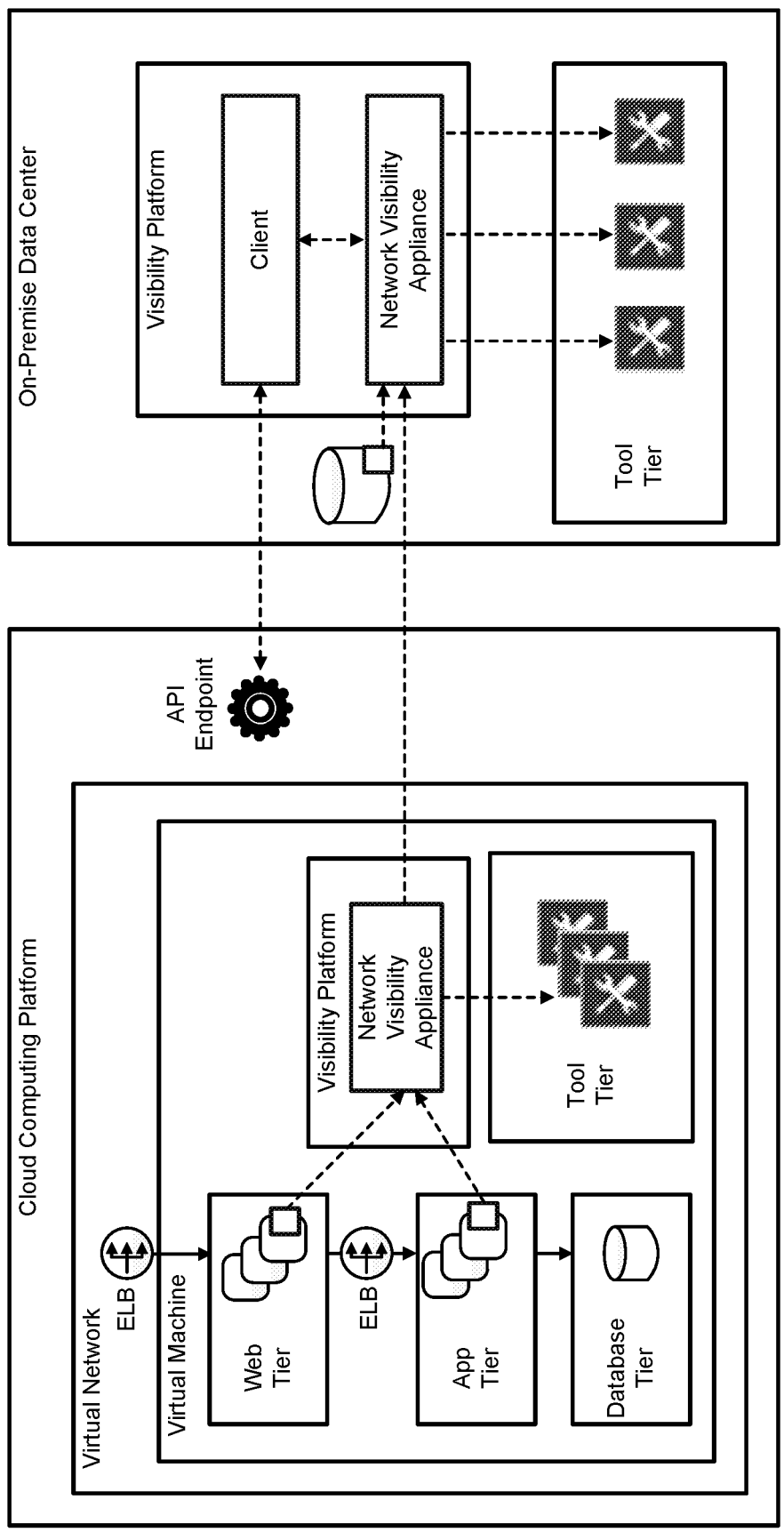
FIG. 16 depicts a deployment model that may be used by a hybrid cloud infrastructure for an end user (e.g., a large enterprise).
Figure 17:
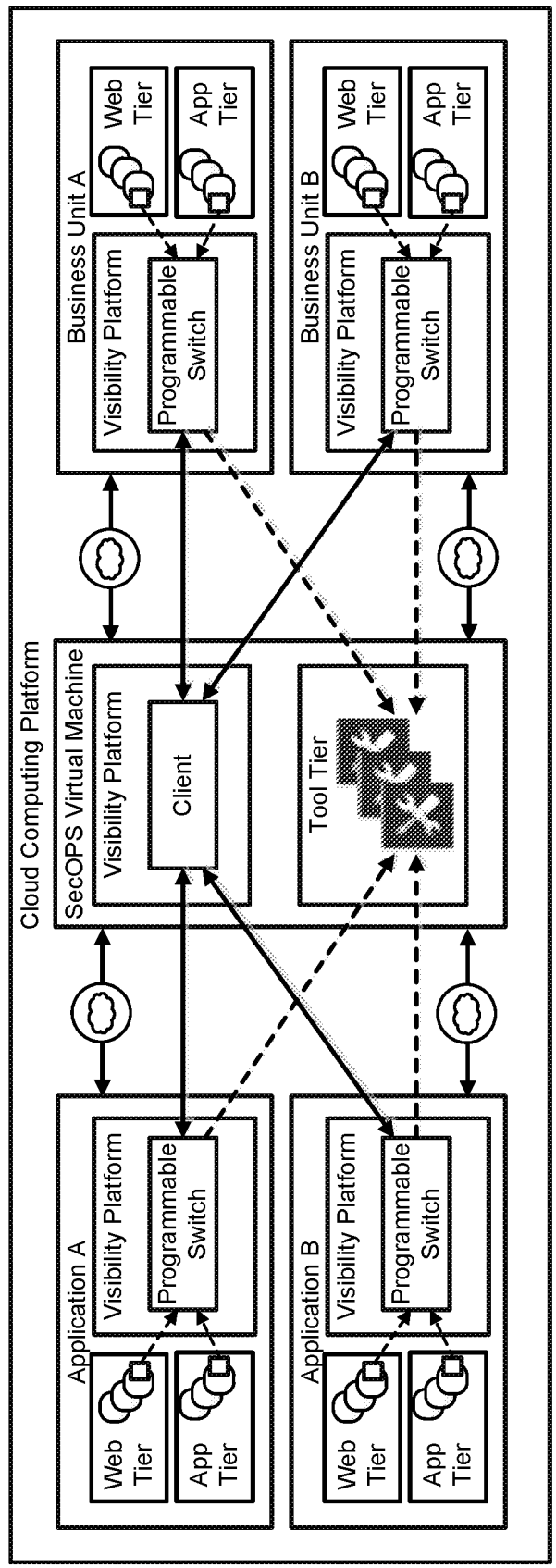
FIG. 17 depicts a series of visibility platforms that reside within different virtual networks in a single cloud computing region.

FIGS. 16-17 depict several different use cases for the visibility platforms described above, and each of these use cases is described in greater depth below. Although FIGS. 16-17 may refer to a particular cloud computing service (e.g., Amazon Web Services), the techniques and architectures described herein can be used with any cloud computing platform.

FIG. 16 depicts a deployment model that may be used by a hybrid cloud infrastructure for an end user (e.g., a large enterprise). More specifically, a remote visibility platform resides within a virtual network (e.g., a Virtual Private Cloud) of a cloud computing platform and is communicatively coupled to a local (e.g., on-premises) visibility platform that resides within an environment controlled by the end user. The remote visibility platform is configured to tap virtualized traffic traversing the cloud computing platform and route some or all of the virtualized traffic back to the local visibility platform for further analysis. This may be accomplished using a tunnel that is constructed using one or more APIs that expose the remote visibility platform and the local visibility platform at each end. Such an embodiment provides visibility into a public cloud infrastructure while preserving end user investment into one or more network tools that are accessible to the local visibility platform.

FIG. 17, meanwhile, depicts a series of visibility platforms that reside within different virtual networks of a single cloud computing region. Such an arrangement may be used to provide centralized visibility for multi-virtual network deployments. For example, the design shown here could be used for public cloud infrastructures that have multiple virtual networks for different applications, business units, end users, etc. Enterprises who have migrated and/or deployed all of their applications to a cloud computing platform (either public or private) are typically said to be following an all-in approach (and may be referred to as "all-in-the-cloud enterprises").

In such embodiments, a centralized virtual network that is managed by, for example, a security operations (SecOps) team can be used for security or analytics, thereby eliminating the requirement that each virtual network host a separate tool tier for one or more network tools. An end user may also be able to utilize a network connection between multiple virtual networks (e.g., using Amazon Web Services VPC Peering) to route virtualized traffic and save network costs for central traffic inspection and analysis. Thus, implementation of the visibility platform design shown in FIG. 16 can reduce network tool proliferation while allowing for effective, centralized visibility for an all-in-the-cloud enterprise.

An end user could also manage a distributed visibility fabric using a graph that defines the distributed visibility fabric as a whole. FIG. 18, for example, depicts a process 1800 for managing a distributed visibility fabric that includes multiple visibility platforms.

A client can initially construct, for each visibility platform of the multiple visibility platforms, a separate graph that visually represents traffic flow to generate a plurality of graphs (step 1801). Each graph can include nodes that represent network objects and connections between pairs of nodes that represent traffic flows between pairs of network objects.

The client can then generate a visual representation of the distributed visibility fabric (step 1802). The visual representation may include the plurality of graphs corresponding to the plurality of visibility platforms. Each graph of the plurality of the graphs may be a DAG. In such embodiments, the visual representation of the distributed visibility fabric may also be a DAG.

The client may cause the visual representation of the distributed visibility fabric to be displayed by a computing device (step 1803). An end user may be able to modify the individual visibility fabrics by modifying the corresponding graphs. Moreover, the end user may be able to modify the distributed visibility fabric by modifying the visual representation.

A controller can map the network objects represented by the multiple graphs included in the visual representation of the distributed visibility fabric onto multiple network visibility appliances (step 1804). The controller may perform such an action automatically on behalf of the end user (i.e., without requiring user input).

In some embodiments, the controller also monitors the connectivity status of each network visibility appliance (step 1805). Said another way, the controller can continually determine whether each network visibility appliance is capable of receiving and transmitting data packets. The controller may determine that a first network visibility appliance has become unresponsive (step 1806). In such instances, the controller can modify a traffic flow directed toward the first network visibility appliance by redirecting the traffic flow to a second network visibility appliance (step 1807). For example, the controller may automatically modify entries within a data structure accessible to a programmable switch that cause the traffic flow to be routed toward the first network visibility appliance. Moreover, the controller may copy traffic rule(s) hosted on the first network visibility appliance to the second network visibility appliance so that filtering policies continue to be applied.

Unless contrary to physical possibility, it is envisioned that the steps in the processes described above (e.g., process 1100 of FIG. 11, process 1300 of FIG. 13, process 1400 of FIG. 14, and process 1800 of FIG. 18) may be performed in various sequences and combinations. Other steps could also be included in some embodiments. Moreover, while the steps of these processes have been described as being executed by certain component (e.g., network visibility appliances, controllers, and clients), those steps could also be executed by other components and computing devices (e.g., a distinct computing device communicatively coupled to a programmable switch of a network visibility appliance).

Processing System

Figure 19:
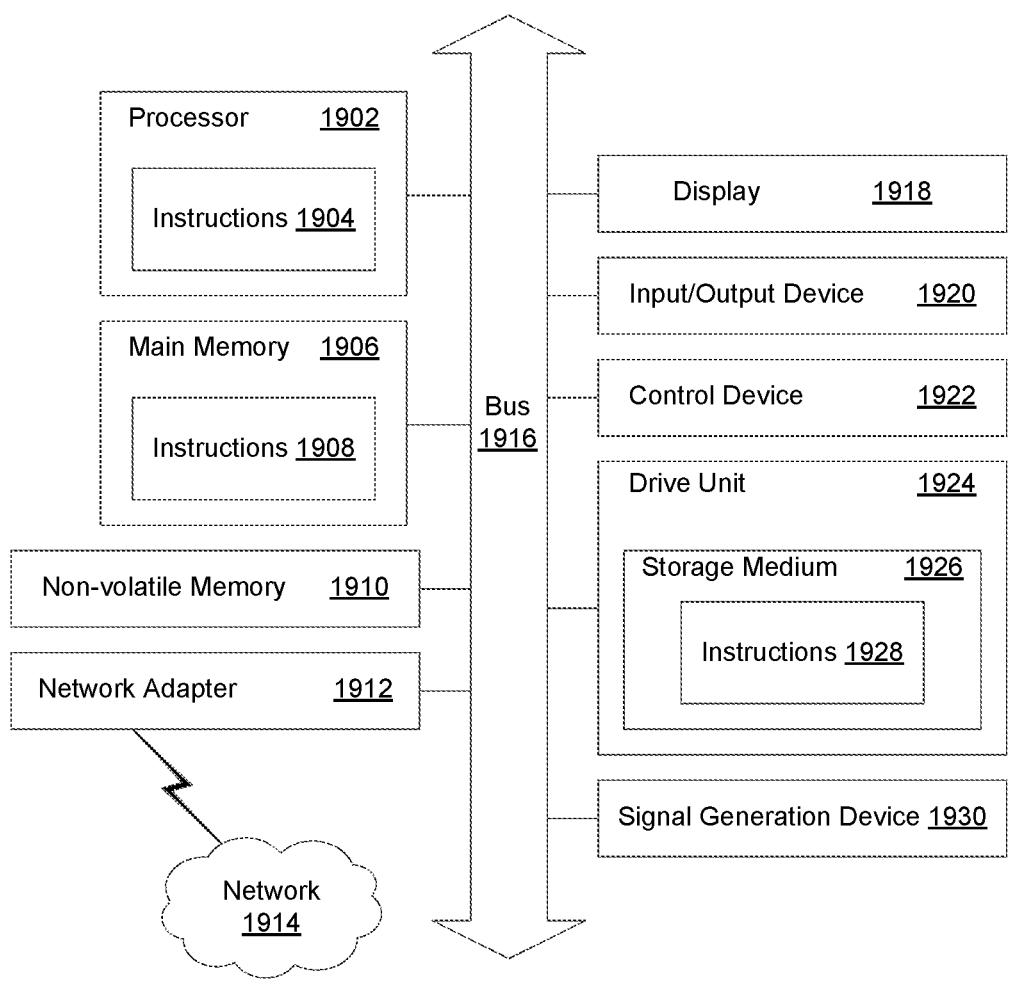
FIG. 19 is a high-level block diagram illustrating an example of a processing system in which at least some operations described herein can be implemented.

FIG. 19 is a block diagram illustrating an example of a processing system 1900 in which at least some operations described herein can be implemented. For example, the processing system 1900 may be responsible for generating an interface through which an end user modifies the visibility fabric including one or more visibility platforms, interacts with a graph representing the visibility fabric, etc. As another example, at least a portion of the processing system 1900 may be included in a computing device (e.g., a server) that supports a cloud computing platform. The process system 1900 may include one or more processors 1902, main memory 1906, non-volatile memory 1910, network adapter 1912 (e.g., network interfaces), display 1918, input/output devices 1920, control device 1922 (e.g., keyboard and pointing devices), drive unit 1924 including a storage medium 1926, and signal generation device 1930 that are communicatively connected to a bus 1916. The bus 1916 is illustrated as an abstraction that represents any one or more separate physical buses, point to point connections, or both connected by appropriate bridges, adapters, or controllers. The bus 1916, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of a network appliance, such as a switching engine, network port(s), tool port(s), etc.

In various embodiments, the processing system 1900 operates as a standalone device, although the processing system 1900 may be connected (e.g., wired or wirelessly) to other devices. For example, the processing system 1900 may include a terminal that is coupled directly to a network appliance. As another example, the processing system 1900 may be wirelessly coupled to the network appliance.

In various embodiments, the processing system 1900 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the processing system 1900.

While the main memory 1906, non-volatile memory 1910, and storage medium 1926 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1928. The term "machine-readable medium" and "storage medium" shall also be taken to include any medium that is capable of storing, encoding, or carrying a set of instructions for execution by the processing system 1900 and that cause the processing system 1900 to perform any one or more of the methodologies of the presently disclosed embodiments.

In general, the routines that are executed to implement the technology may be implemented as part of an operating system or a specific application, component, program, object, module, or sequence of instructions (collectively referred to as "computer programs"). The computer programs typically comprise one or more instructions (e.g., instructions 1904, 1908, 1928) set at various times in various memory and storage devices in a computer, and that, when read and executed by one or more processing units or processors 1902, cause the processing system 1900 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1910, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1912 enables the processing system 1900 to mediate data in a network 1914 with an entity that is external to the processing system 1900, such as a network appliance, through any known and/or convenient communications protocol supported by the processing system 1900 and the external entity. The network adapter 1912 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1912 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    obtaining, by a processing device, information that specifies how a network visibility appliance in a network visibility fabric is to route data traffic through the network visibility fabric, the network visibility fabric being a network fabric for facilitating or enabling monitoring and/or analysis of network traffic;
    populating, by the processing device, a traffic routing data structure that includes one or more flow tables with the information specifying how the network visibility appliance is to route the data traffic through the network visibility fabric, the network visibility appliance including a plurality of network objects capable of receiving incoming network traffic for enabling the network visibility appliance to monitor virtualized traffic, the plurality of network objects including a raw endpoint, a tunnel endpoint, an application endpoint and a routing map, the one or more flow tables including a plurality of traffic routing entries, including a separate traffic routing entry for each of the plurality of network objects,
    wherein the tunnel endpoint receives data packets from, or sends data packets to, an environment outside of the network visibility appliance, the application endpoint receives data packets from, or sends data packets to, an application program, and the routing map includes a rule for filtering data packets; and
    wherein each traffic routing entry includes information that indicates how a data packet received by a corresponding network object should be routed next;
    causing, by the processing device, the network visibility appliance to implement the traffic routing data structure to route data traffic through the network visibility fabric;
    receiving, by the processing device, input that specifies a modification by a user to the network visibility fabric; and
    modifying, by the processing device, a traffic routing entry in one of the one or more flow tables, automatically in response to the input that specifies the modification by the user to the network visibility fabric, to produce a modified traffic routing data structure; and
    causing, by the processing device, the network visibility appliance to implement the modified traffic routing data structure to route data traffic through the network visibility fabric according to the modification.

2. The method of claim 1, wherein the network visibility fabric includes a plurality of network tools that each provide a different service.

3. The method of claim 1, further comprising:
    identifying a map that contains a traffic filtering rule and that is implemented by the network visibility appliance; and
    creating a flow table for the map by
        populating the flow table for the map with an entry for the traffic filtering rule, and
        associating the entry for the traffic filtering rule with an action that specifies how data packets that satisfy the traffic filtering rule should be handled.

4. The method of claim 3, wherein the map is one of a plurality of maps implemented by the network visibility appliance, and wherein a separate flow table is created for each map of the plurality of maps so as to create a plurality of flow tables.

5. The method of claim 3, further comprising:
    routing the traffic through the network visibility fabric based on the flow table for the map.

6. The method of claim 5, wherein the data structure is used by the network visibility appliance to route incoming data packets received at an ingress port of the network visibility appliance to a tunnel endpoint, an application endpoint, or according to the map.

7. The method of claim 1, further comprising:
    constructing a graph to visually represent the network visibility appliance by creating a node for each of the plurality of network objects, and creating a connection between a pair of nodes for each traffic flow between a pair of objects in the plurality of network objects; and
    transmitting the graph to a computing device for display to the user, such that the user is able to specify the modification to the network visibility fabric by modifying the graph.

8. The method of claim 1, wherein the data structure further includes entries for a plurality of network tools such that the network visibility appliance is able to route traffic through a plurality of service chains.

9. The method of claim 8, wherein each service chain of the plurality of service chains is associated with a different traffic protocol, origination source, destination source, data packet type, data packet header content, or data packet payload content.

10. A network visibility appliance comprising:
    an ingress port through which to receive data traffic; and
    a processor configured to:
        obtain information that specifies how the network visibility appliance is to guide the data traffic through a network visibility fabric that includes a plurality of network objects in the network visibility appliance for enabling the network visibility appliance to monitor virtualized traffic, the plurality of network objects including a raw endpoint, a tunnel endpoint, an application endpoint and a routing map,
        wherein the tunnel endpoint receives data packets from, or sends data packets to, an environment outside of the network visibility appliance, the application endpoint receives data packets from, or sends data packets to, an application program, and the routing map includes a rule for filtering data packets;
        populate a traffic routing data structure with respective entries for the ingress port and each network object of the plurality of network objects, wherein each entry includes information that indicates how data packets received at a corresponding network object should be routed next so as to define a sequence by which packets are to be routed through the plurality of network objects, and modify, in real time, the data structure responsive to a determination that input specifying a modification of the sequence has been received, such that the traffic is guided by the network visibility appliance through a modified sequence of the plurality of network objects in response to the input specifying the modification of the sequence.

11. The network visibility appliance of claim 10, further comprising: an egress port through which to route the data traffic toward a destination.

12. The network visibility appliance of claim 11, wherein the destination is a cloud computing platform from which the traffic originates.

13. The network visibility appliance of claim 11, wherein the ingress port is a raw endpoint, a tunnel endpoint, or an application endpoint, and wherein the egress port is a tunnel endpoint or an application endpoint.

14. The network visibility appliance of claim 10, further comprising:

a data store that includes (i) the traffic routing data structure and (ii) a plurality of service chain arrangements, wherein each service chain arrangement of the plurality of service chain arrangements is associated with a particular traffic characteristic.

15. At least one non-transitory machine-readable storage medium having stored therein instructions, execution of which in a processing system causes the processing system to perform a process comprising:

obtaining information that specifies how a network visibility appliance in a network visibility fabric is to route data traffic through a network visibility fabric that includes a plurality of network objects in the network visibility appliance for enabling the network visibility appliance to monitor virtualized traffic, the plurality of network objects including a raw endpoint, a tunnel endpoint, an application endpoint and a routing map;

wherein the tunnel endpoint receives data packets from, or sends data packets to, an environment outside of the network visibility appliance, the application endpoint receives data packets from, or sends data packets to, an application program, and the routing map includes a rule for filtering data packets;

populating a traffic routing data structure that includes one or more flow tables with the information specifying how the network visibility appliance is to route the data traffic through the network visibility fabric, the network visibility appliance including a plurality of network objects capable of receiving incoming network traffic, the one or more flow tables including a plurality of traffic routing entries, including a separate traffic routing entry for each of the plurality of network objects, wherein each traffic routing entry includes information that indicates how a data packet received by a corresponding network object should be routed next;

causing the network visibility appliance to implement the traffic routing data structure to route data traffic through the network visibility fabric;

receiving input that specifies a modification by a user to the network visibility fabric; and modifying a traffic routing entry in one of the one or more flow tables automatically, in response to the input that specifies the modification by the user to the network visibility fabric, to produce a modified traffic routing data structure; and causing the network visibility appliance to implement the modified traffic routing data structure to route data traffic through the network visibility fabric according to the modification.

16. The at least one non-transitory machine-readable storage medium of claim 15, wherein in the process, the network visibility fabric includes a plurality network tools that each provide a different service.

17. The at least one non-transitory machine-readable storage medium of claim 15, the instructions being such that the process further comprises:

identifying a map that contains a traffic filtering rule and that is implemented by the network visibility appliance; and creating a flow table for the map by
populating the flow table for the map with an entry for the traffic filtering rule, and
associating the entry for the traffic filtering rule with an action that specifies how data packets that satisfy the traffic filtering rule should be handled.

18. The at least one non-transitory machine-readable storage medium of claim 17, wherein in the process, the map is one of a plurality of maps implemented by the network visibility appliance, and wherein a separate flow table is created for each map of the plurality of maps so as to create a plurality of flow tables.

19. The at least one non-transitory machine-readable storage medium of claim 17, the instructions being such that the process further comprises:

routing the traffic through the network visibility fabric based on the flow table for the map.

20. The at least one non-transitory machine-readable storage medium of claim 19, wherein in the process, the data structure is used by the network visibility appliance to route incoming data packets received at an ingress port of the network visibility appliance to the tunnel endpoint, the application endpoint, or according to the map.

21. The at least one non-transitory machine-readable storage medium of claim 15, the instructions being such that the process further comprises:

constructing a graph to visually represent the network visibility appliance by creating a node for each of the plurality of network objects, and creating a connection between a pair of nodes for each traffic flow between a pair of objects in the plurality of network objects; and transmitting the graph to a computing device for display to the user, such that the user is able to specify the modification to the network visibility fabric by modifying the graph.

22. The at least one non-transitory machine-readable storage medium of claim 15, wherein in the process, the data structure further includes entries for a plurality of network tools such that the network visibility appliance is able to route traffic through a plurality of service chains.

23. The at least one non-transitory machine-readable storage medium of claim 22, wherein in the process, each service chain of the plurality of service chains is associated with a different traffic protocol, origination source, destination source, data packet type, data packet header content, or data packet payload content.

* * * * *